United States Patent
Maehara et al.

(10) Patent No.: US 9,615,298 B2
(45) Date of Patent: Apr. 4, 2017

(54) OFF-LOAD APPARATUS, NETWORK SYSTEM, AND HANDOVER METHOD OF MULTICAST TRAFFIC

(71) Applicant: FUJITSU LIMITED, Kawasaki-shi (JP)

(72) Inventors: Satoshi Maehara, Yokohama (JP); Masaharu Kako, Toukai (JP)

(73) Assignee: FUJITSU LIMITED, Kawasaki (JP)

( * ) Notice: Subject to any disclaimer, the term of this patent is extended or adjusted under 35 U.S.C. 154(b) by 455 days.

(21) Appl. No.: 13/859,197

(22) Filed: Apr. 9, 2013

(65) Prior Publication Data
US 2014/0029501 A1    Jan. 30, 2014

(30) Foreign Application Priority Data
Jul. 27, 2012  (JP) .................................. 2012-166993

(51) Int. Cl.
 *H04L 12/18*  (2006.01)
 *H04W 36/16*  (2009.01)
 (Continued)

(52) U.S. Cl.
 CPC .......... *H04W 36/16* (2013.01); *H04L 12/189* (2013.01); *H04N 21/25841* (2013.01);
 (Continued)

(58) Field of Classification Search
 CPC .................................................. H04L 12/189
 (Continued)

(56) References Cited

U.S. PATENT DOCUMENTS 5,825,759 A * 10/1998 Liu .............................. 370/331
7,130,307 B2    10/2006 Nakamura et al.
(Continued)

FOREIGN PATENT DOCUMENTS

CN    1496159    5/2004
CN    102118789  7/2011
(Continued)

OTHER PUBLICATIONS

JPOA—Office Action of Japanese Patent Application No. 2012-166993 dated Feb. 2, 2016, with English translation of the relevant part, p. 2, line 6 to p. 5, line 30 of the Office Action.
(Continued)

*Primary Examiner* — Andrew Lai
*Assistant Examiner* — Andrew C Lee
(74) *Attorney, Agent, or Firm* — Fujitsu Patent Center

(57) ABSTRACT

An off-load apparatus is disposed between a core network accommodating base stations and the base stations capable of connection with a mobile station. The off-load apparatus includes a storage unit that stores line information and multicast viewing information of the mobile station when the mobile station performs multicast communication of an off-load object via the off-load apparatus; a transferring unit that transfers the line information and the multicast viewing information of the mobile station to another off-load apparatus that is an handover destination when the mobile station moves during the multicast communication; and a control unit that executes a process of participating in multicast viewing on behalf of the mobile station when the off-load apparatus acts as a handover-destination apparatus, based on the multicast viewing information transferred from a handover-source off-load apparatus.

7 Claims, 43 Drawing Sheets

(51) Int. Cl.
*H04N 21/258* (2011.01)
*H04N 21/61* (2011.01)
*H04N 21/6405* (2011.01)
*H04W 36/12* (2009.01)
*H04W 88/16* (2009.01)

(52) U.S. Cl.
CPC ..... *H04N 21/6131* (2013.01); *H04N 21/6405* (2013.01); *H04W 36/12* (2013.01); *H04W 88/16* (2013.01)

(58) Field of Classification Search
USPC ........ 370/252, 312, 331, 338; 455/434, 442, 455/557
See application file for complete search history.

(56) References Cited

U.S. PATENT DOCUMENTS

| | | | | |
|---|---|---|---|---|
| 7,970,405 | B2* | 6/2011 | Baek et al. | 455/442 |
| 8,169,972 | B2* | 5/2012 | Chiu | H04L 12/1877 370/331 |
| 8,897,161 | B2* | 11/2014 | Fujishima | H04W 36/20 370/252 |
| 8,989,021 | B2* | 3/2015 | Simon | H04W 4/06 370/241 |
| 2004/0085926 | A1 | 5/2004 | Hwang et al. | |
| 2007/0058629 | A1* | 3/2007 | Luft | H04L 67/42 370/390 |
| 2007/0136777 | A1* | 6/2007 | Hasek | H04N 7/17318 725/114 |
| 2008/0200188 | A1* | 8/2008 | Rajahalme et al. | 455/458 |
| 2008/0216143 | A1* | 9/2008 | Ikeda | H04H 20/82 725/116 |
| 2008/0244658 | A1* | 10/2008 | Chen | H04N 7/17318 725/50 |
| 2009/0222874 | A1* | 9/2009 | White | H04N 7/173 725/118 |
| 2009/0264125 | A1* | 10/2009 | Rofougaran | 455/434 |
| 2009/0298484 | A1* | 12/2009 | White | H04H 20/24 455/414.3 |
| 2010/0272004 | A1* | 10/2010 | Maeda et al. | 370/312 |
| 2010/0319023 | A1* | 12/2010 | Ko | H04N 7/17318 725/37 |
| 2010/0322128 | A1* | 12/2010 | Becker et al. | 370/312 |
| 2012/0082064 | A1* | 4/2012 | Awoniyi et al. | 370/255 |
| 2012/0106370 | A1* | 5/2012 | Radulescu et al. | 370/252 |
| 2012/0124628 | A1* | 5/2012 | Kim | H04N 21/4126 725/87 |
| 2012/0151028 | A1* | 6/2012 | Lu et al. | 709/223 |
| 2012/0269134 | A1 | 10/2012 | Jin et al. | |
| 2012/0314641 | A1* | 12/2012 | Kotecha et al. | 370/312 |
| 2014/0029580 | A1* | 1/2014 | Jung et al. | 370/331 |

FOREIGN PATENT DOCUMENTS

| | | |
|---|---|---|
| JP | 2001-177564 | 6/2001 |
| JP | 2002-374276 | 12/2002 |
| JP | 2004-135292 | 4/2004 |
| JP | 2007-228450 | 9/2007 |
| JP | 2013-517640 | 5/2013 |
| WO | 2011/079634 A1 | 7/2011 |

OTHER PUBLICATIONS

CNOA—Office Action of Chinese Patent Application No. 201310205671.7 dated Mar. 3, 2016, with partial English translation of the Office Action.

CNOA—Notification of the Second Office Action for Chinese Patent Application No. 201310205671.7 dated Nov. 1, 2016, with partial English translation of the Office Action.

\* cited by examiner

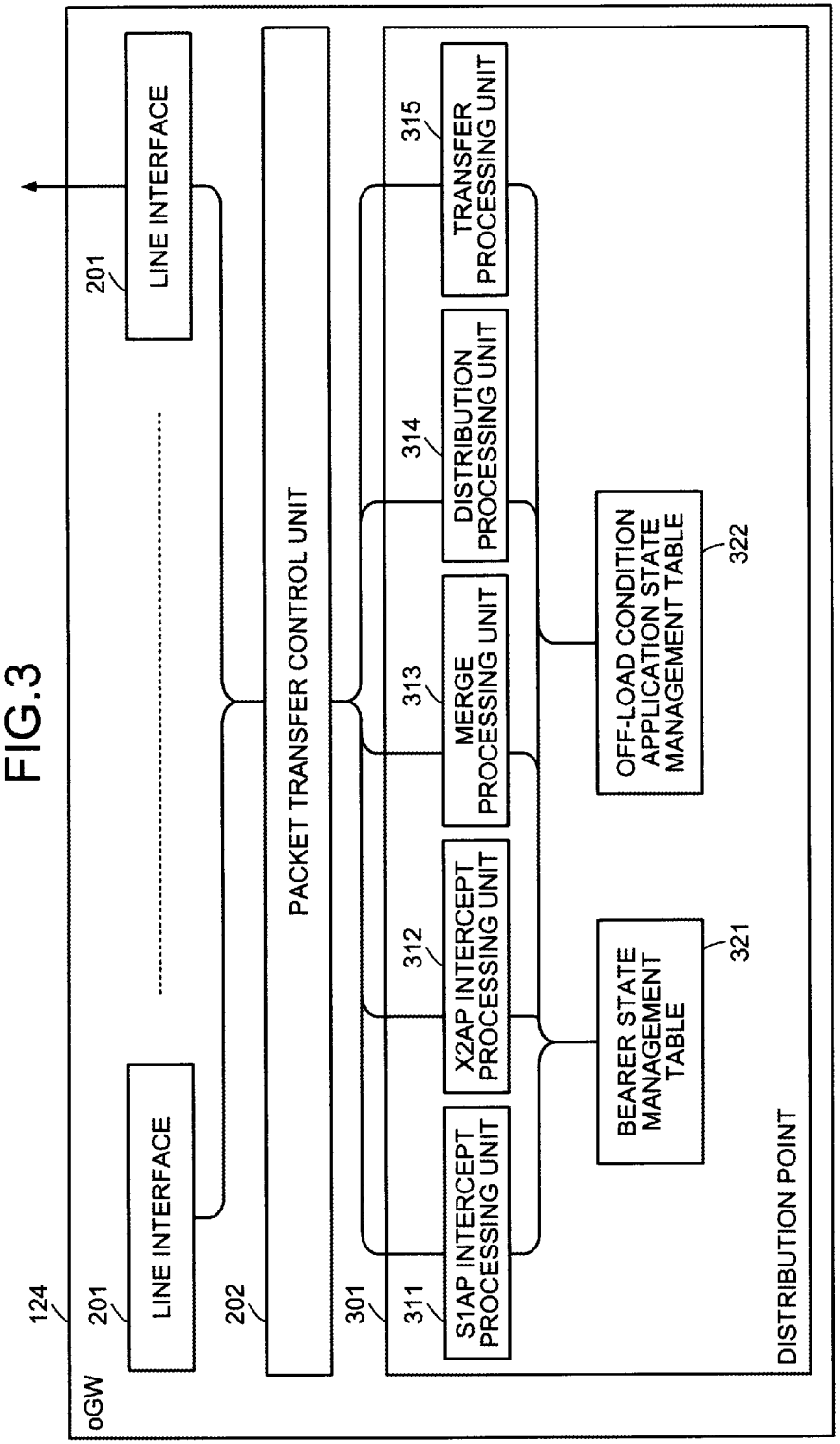

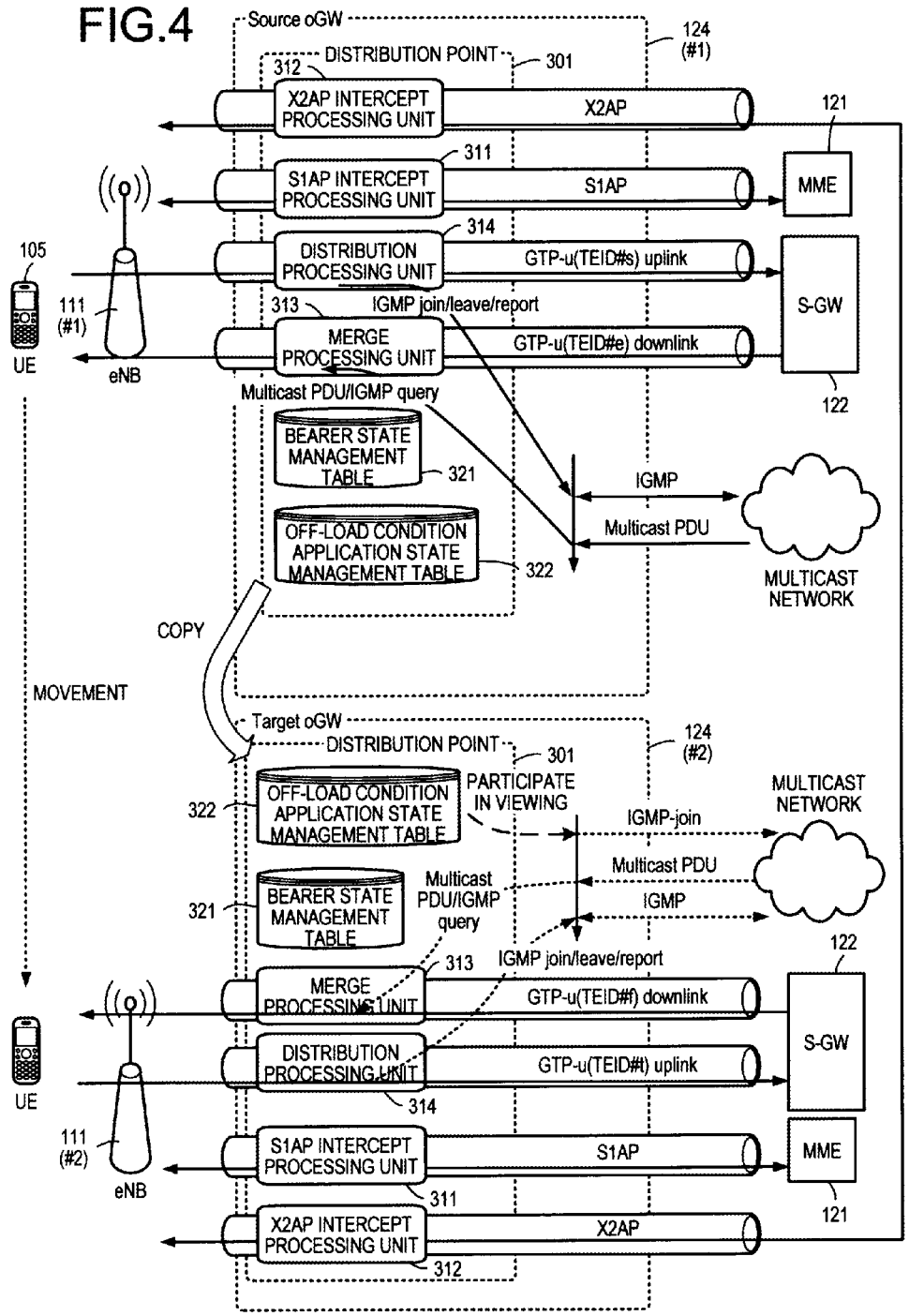

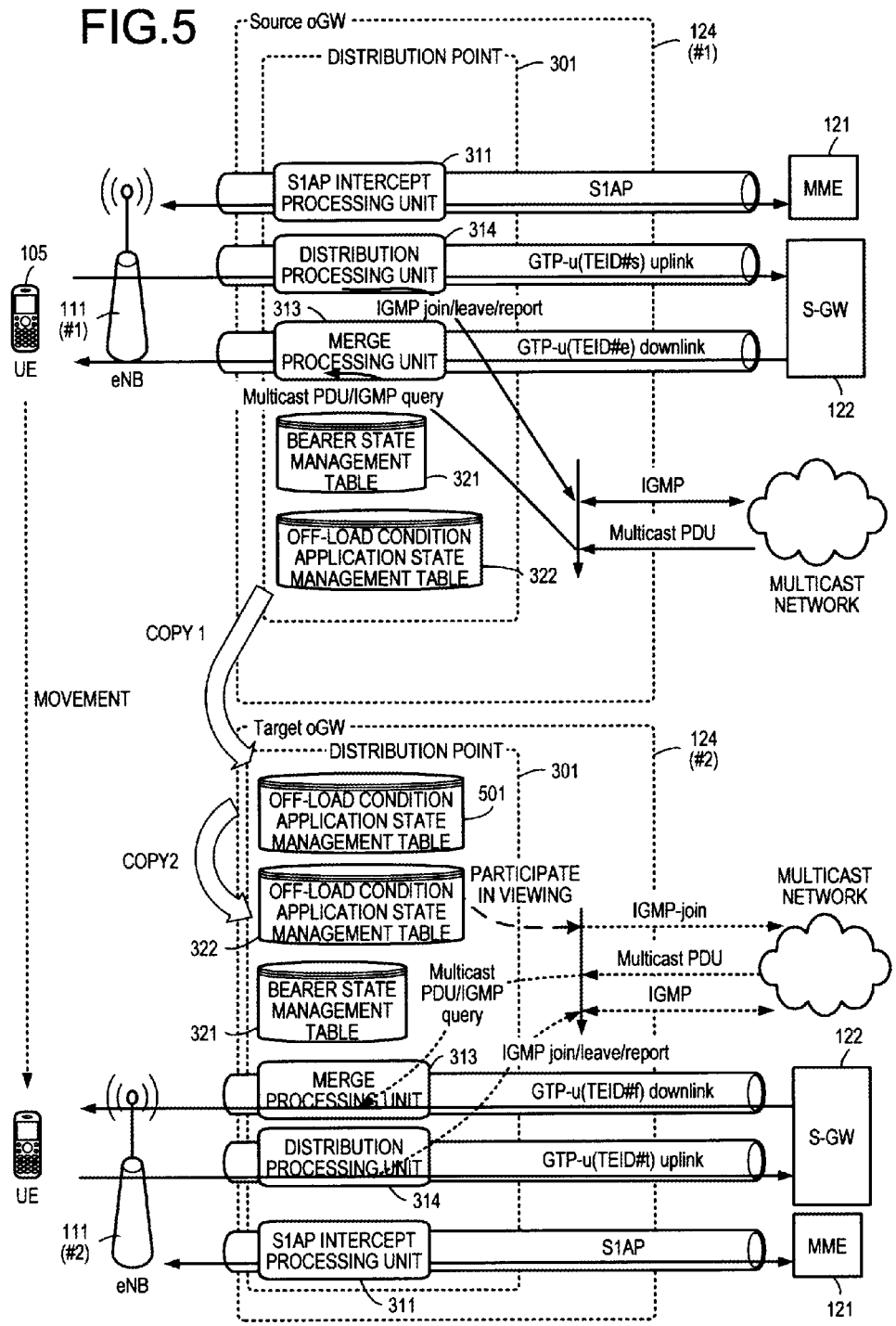

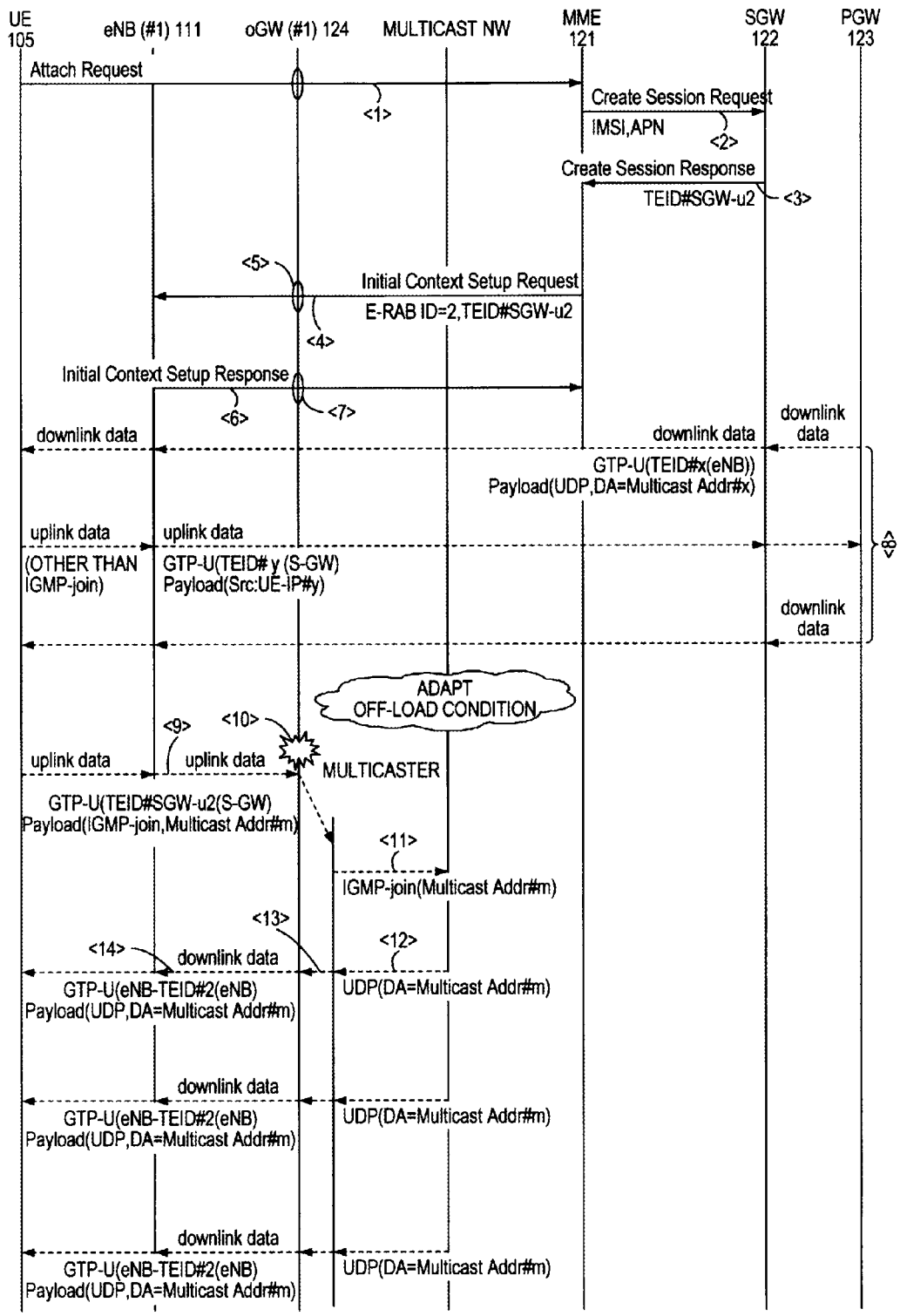

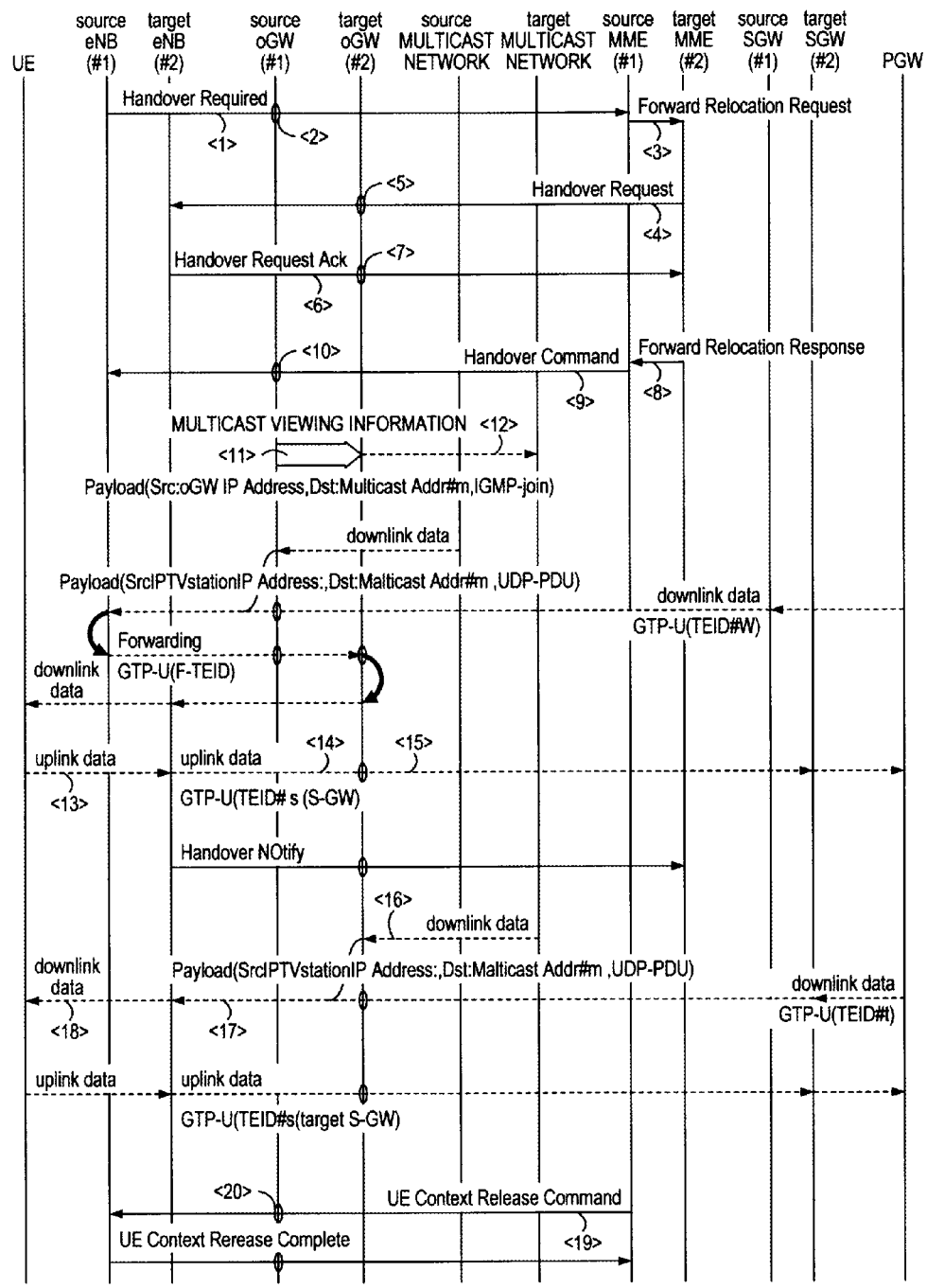

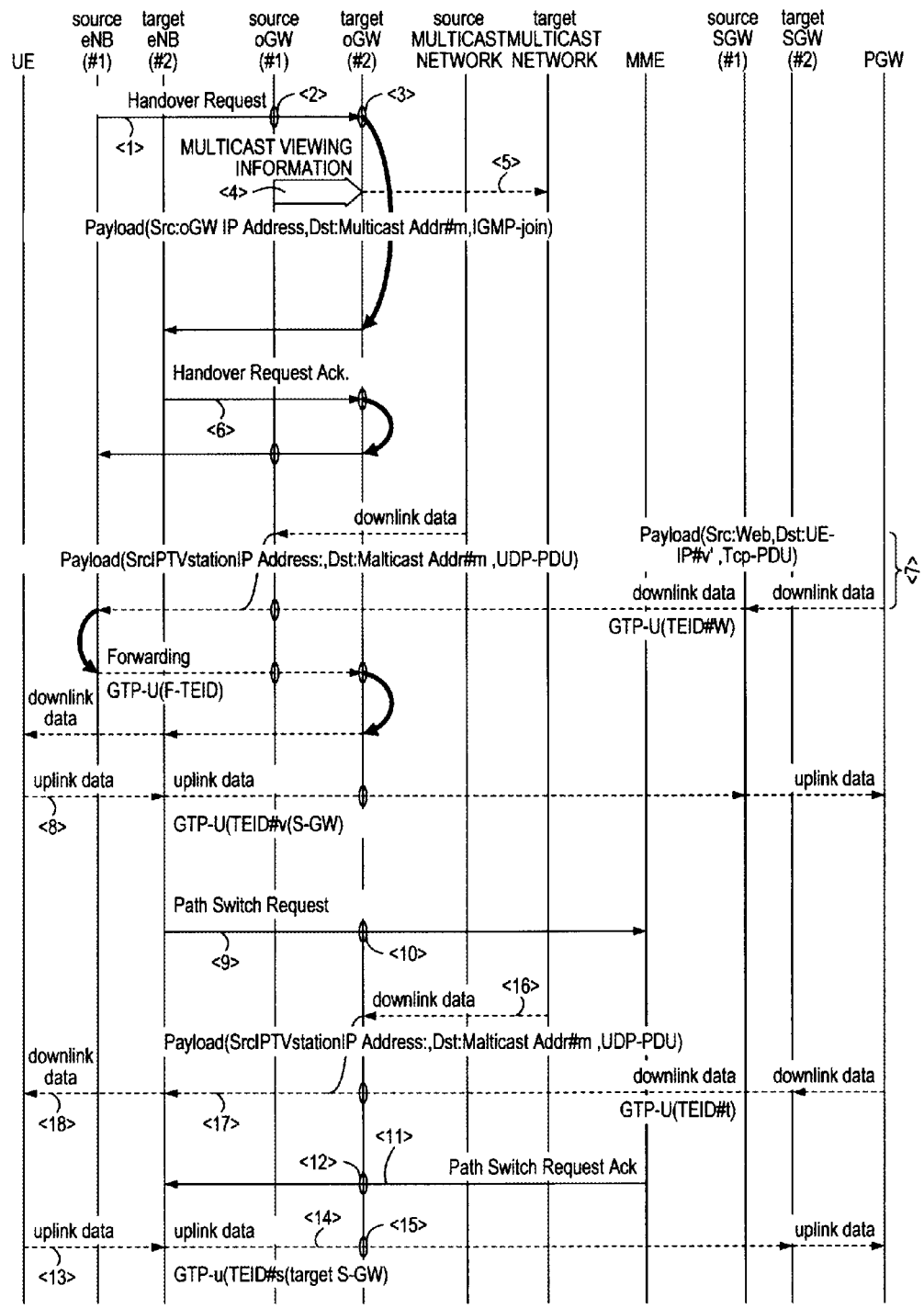

FIG.8

OFF-LOAD CONDITION APPLICATION STATE MANAGEMENT TABLE  322

| oGW UE IDENTIFIER | USER LINE IDENTIFIER (E RAB ID) | MULTICAST VIEWING INFORMATION |
|---|---|---|
| 8000 | 2 | MulticastAddr#m |
| 8001 | 2 | MulticastAddr#o |
| 8000 | 2 | MulticastAddr#n |
| 8000 | 2 | MulticastAddr#o |
| | | |
| | | |
| | | |

FIG.9

EXAMPLE OF IGMP-join   901

| IGMP | Type = Version 2 Membership Report |
| --- | --- |
| | Group Address = Multicast Addr#m |
| IP | SA : UE IP Address , DA : Multicast Addr#m |
| GTP-u | TEID=TEID#SGW-u2   (for S-GW) |
| UDP_G | UDP HEADER |
| IP_G | SA : eNB#1 IP Address , DA : S-GW#1 IP Address |
| L2 | L2 HEADER |
| L1 | L1 HEADER |

EXAMPLE OF IGMP-leave   902

| IGMP | Type = Leave Group |
| --- | --- |
| | Group Address = Multicast Addr#m |
| IP | SA : UE IP Address , DA : 224.0.0.2 |
| GTP-u | TEID=TEID#SGW-u2   (for S-GW) |
| UDP_G | UDP HEADER |
| IP_G | SA : eNB#1 IP Address , DA : S-GW#1 IP Address |
| L2 | L2 HEADER |
| L1 | L1 HEADER |

| UDP | IPTV BROADCAST CONTENTS |
|---|---|
| IP | SA : Multicast Address , DA : Multicast Addr#m |
| GTP-u | TEID=eNB-TEID#2 (for eNB) |
| UDP_G | UDP HEADER |
| IP_G | SA : S-GW#1 IP Address , DA : eNB#1 IP Address |
| L2 | L2 HEADER |
| L1 | L1 HEADER |

FIG.11

EXAMPLE OF IGMP-join

1101

| IGMP | Type = Version 2 Membership Report |
|---|---|
|  | Group Address = Multicast Addr#m |
| IP | SA : oGW IP Address , DA : Multicast Addr#m |
| L2 | L2 HEADER |
| L1 | L1 HEADER |

EXAMPLE OF IGMP-leave

1102

| IGMP | Type = Leave Group |
|---|---|
|  | Group Address = Multicast Addr#m |
| IP | SA : oGW IP Address , DA : 224.0.0.2 |
| L2 | L2 HEADER |
| L1 | L1 HEADER |

FIG.12

| UDP | IPTV BROADCAST CONTENTS |
|---|---|
| IP | SA : IPTVstation IP Address , DA : Multicast Addr#m |
| L2 | L2 HEADER |
| L1 | L1 HEADER |

FIG.14

| | |
|---|---|
| S1AP | Message type=Initial Context Setup Request |
| | MME UE S1AP ID = MME#1 UE S1AP ID#x |
| | eNB UE S1AP ID = eNB#1 UE S1AP ID#x |
| | E-RAB to Be Setup list |
| | E-RAB ID=1 / GTP-TEID=TEID#SGW-u1 |
| | E-RAB ID=2 / GTP-TEID=TEID#SGW-u2 |
| SCTP | SCTP HEADER |
| IP | SA : MME#1 IP Address , DA : eNB#1 IP Address |
| L2 | L2 HEADER |
| L1 | L1 HEADER |

FIG.15

| | |
|---|---|
| S1AP | Message type=Initial Context Setup Response |
| | MME UE S1AP ID = MME#1 UE S1AP ID#x |
| | eNB UE S1AP ID = eNB#1 UE S1AP ID#x |
| | E-RAB to Be Setup list |
| | E-RAB ID=1 / GTP-TEID=eNB-TEID#1 |
| | E-RAB ID=2 / GTP-TEID=eNB-TEID#2 |
| SCTP | SCTP HEADER |
| IP | SA : eNB#1 IP Address , DA : MME#1 IP Address |
| L2 | L2 HEADER |
| L1 | L1 HEADER |

FIG.16

| | |
|---|---|
| S1AP | Message type=Handover Required |
| | MME UE S1AP ID = MME#1 UE S1AP ID#x |
| | eNB UE S1AP ID = eNB#1 UE S1AP ID#x |
| | Target ID= eNB#2 |
| | Source to Target Transparent Container = CellID#x |
| SCTP | SCTP HEADER |
| IP | SA : eNB#1 IP Address , DA : MME#1 IP Address |
| L2 | L2 HEADER |
| L1 | L1 HEADER |

FIG.17

| | Message type=Handover Request | |
|---|---|---|
| S1AP | MME UE S1AP ID = MME#2 UE S1AP ID#x | |
| | E-RAB to Be Setup list | |
| | E-RAB ID=1 | GTP-TEID=TEID#SGW-u21 |
| | E-RAB ID=2 | GTP-TEID=TEID#SGW-u22 |
| | Source to Target Transparent Container<br>= CellID#x | |
| SCTP | SCTP HEADER | |
| IP | SA : MME#2 IP Address , DA : eNB#2 IP Address | |
| L2 | L2 HEADER | |
| L1 | L1 HEADER | |

FIG.18

| | Message type=Handover Request Ack. | |
|---|---|---|
| S1AP | MME UE S1AP ID = MME#2 UE S1AP ID#x | |
| | eNB UE S1AP ID = eNB#2 UE S1AP ID#x | |
| | E-RAB to Be Setup list | |
| | E-RAB ID=1 | GTP-TEID=eNB-TEID#21 |
| | E-RAB ID=2 | GTP-TEID=eNB-TEID#22 |
| | Target to Source Transparent Container<br>= C-RNTI#x | |
| SCTP | SCTP HEADER | |
| IP | SA : eNB#2 IP Address , DA : MME#2 IP Address | |
| L2 | L2 HEADER | |
| L1 | L1 HEADER | |

FIG.19

| S1AP | Message type=Handover Command |
|---|---|
| | MME UE S1AP ID = MME#1 UE S1AP ID#x |
| | eNB UE S1AP ID = eNB#1 UE S1AP ID#x |
| | Target to Source Transparent Container = C-RNTI#x |
| SCTP | SCTP HEADER |
| IP | SA : MME#1 IP Address , DA : eNB#1 IP Address |
| L2 | L2 HEADER |
| L1 | L1 HEADER |

FIG.20

| S1AP | Message type=UE Context Release Command |
|---|---|
| | MME UE S1AP ID = MME#1 UE S1AP ID#x |
| | eNB UE S1AP ID = eNB#1 UE S1AP ID#x |
| SCTP | SCTP HEADER |
| IP | SA : MME#1 IP Address , DA : eNB#1 IP Address |
| L2 | L2 HEADER |
| L1 | L1 HEADER |

FIG.21

| X2AP | Message type=Handover Request | |
|---|---|---|
| | Old eNB UE X2AP ID = eNB#1 UE X2AP ID#x | |
| | GUMMEI = MME#1 | |
| | UE Context Information | |
| | MME UE S1AP ID = MME#1 UE S1AP ID#x | |
| | E-RAB to Be Setup list | |
| | E-RAB ID=1 | UL GTP Tunnel Endpoint=TEID#SGW-1 |
| | E-RAB ID=2 | UL GTP Tunnel Endpoint=TEID#SGW-2 |
| SCTP | SCTP HEADER | |
| IP | SA : MME#1 IP Address , DA : eNB#1 IP Address | |
| L2 | L2 HEADER | |
| L1 | L1 HEADER | |

FIG.22

| X2AP | Message type=Handover Request Ack. |
|---|---|
| | Old eNB UE X2AP ID = eNB#1 UE X2AP ID#x |
| | New eNB UE X2AP ID = eNB#2 UE X2AP ID#x |
| SCTP | SCTP HEADER |
| IP | SA : eNB#2 IP Address , DA : eNB#1 IP Address |
| L2 | L2 HEADER |
| L1 | L1 HEADER |

FIG.23

| X2AP | Message type=:UE Context Release |
|---|---|
| | Old eNB UE S1AP ID = eNB#1 UE X2AP ID#x |
| | New eNB UE S1AP ID = eNB#2 UE X2AP ID#x |
| SCTP | SCTP HEADER |
| IP | SA : eNB#2 IP Address , DA : eNB#1 IP Address |
| L2 | L2 HEADER |
| L1 | L1 HEADER |

FIG.24

| S1AP | Message type=Path Switch Request | |
|---|---|---|
| | Source MME UE S1AP ID = MME#1 UE S1AP ID#x | |
| | eNB UE S1AP ID = eNB#2 UE S1AP ID#x | |
| | E-RAB to Be Switched in Downlink list | |
| | E-RAB ID=1 | GTP-TEID=eNB-TEID#21 |
| | E-RAB ID=2 | GTP-TEID=eNB-TEID#22 |
| SCTP | SCTP HEADER | |
| IP | SA : eNB#2 IP Address , DA : MME#1 IP Address | |
| L2 | L2 HEADER | |
| L1 | L1 HEADER | |

FIG.25

| S1AP | Message type=Path Switch Request Ack. | |
| --- | --- | --- |
| | MME UE S1AP ID = MME#1 UE S1AP ID#x | |
| | eNB UE S1AP ID = eNB#2 UE S1AP ID#x | |
| | E-RAB to Be Switched Uplink list | |
| | E-RAB ID=1 | GTP-TEID=TEID#SGW-u21 |
| | E-RAB ID=2 | GTP-TEID=TEID#SGW-u22 |
| SCTP | SCTP HEADER | |
| IP | SA : MME#1 IP Address , DA : eNB#2 IP Address | |
| L2 | L2 HEADER | |
| L1 | L1 HEADER | |

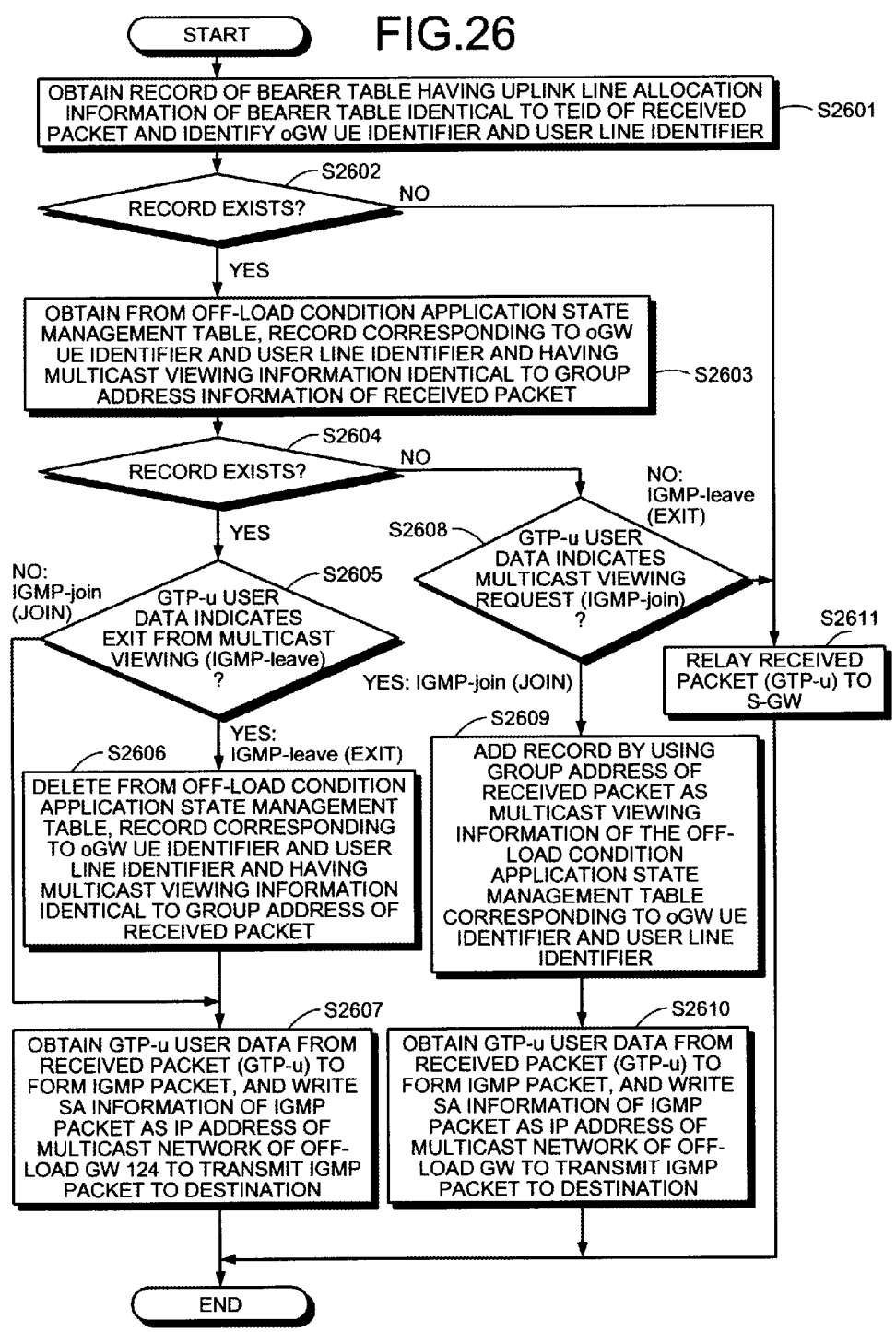

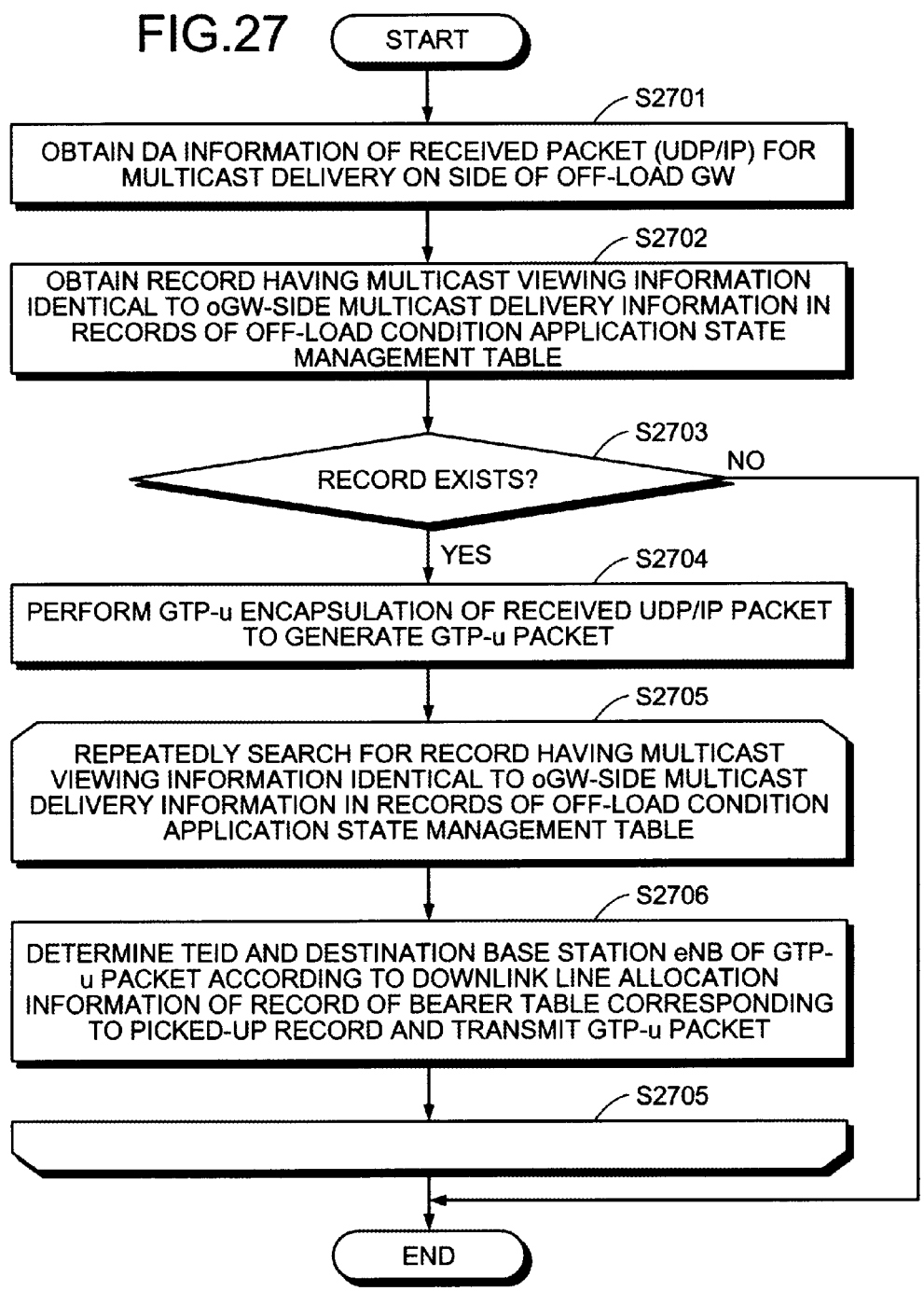

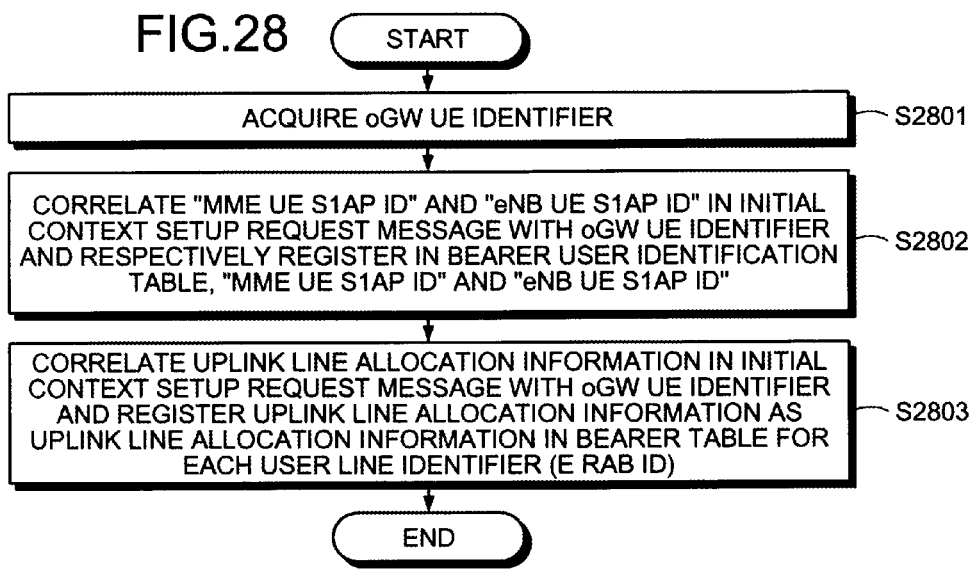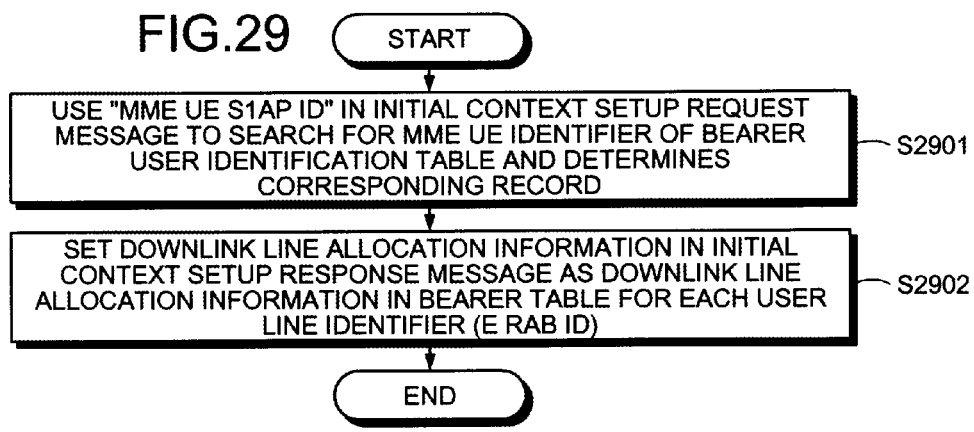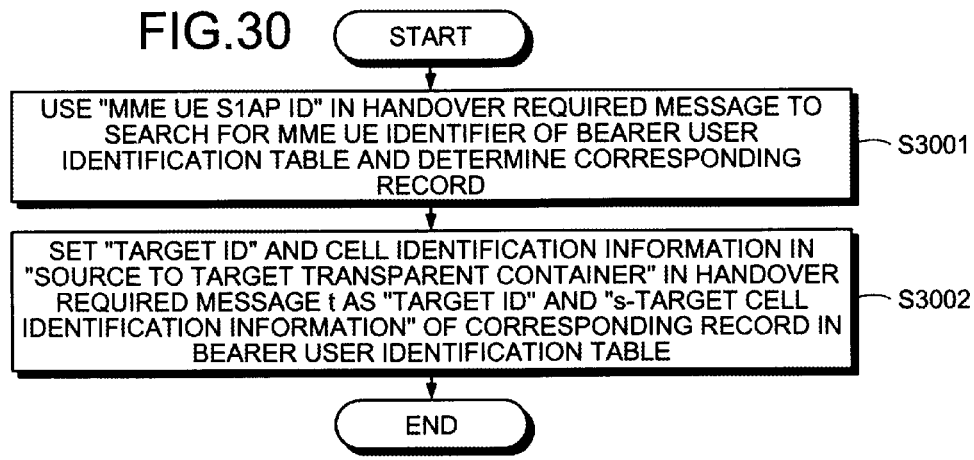

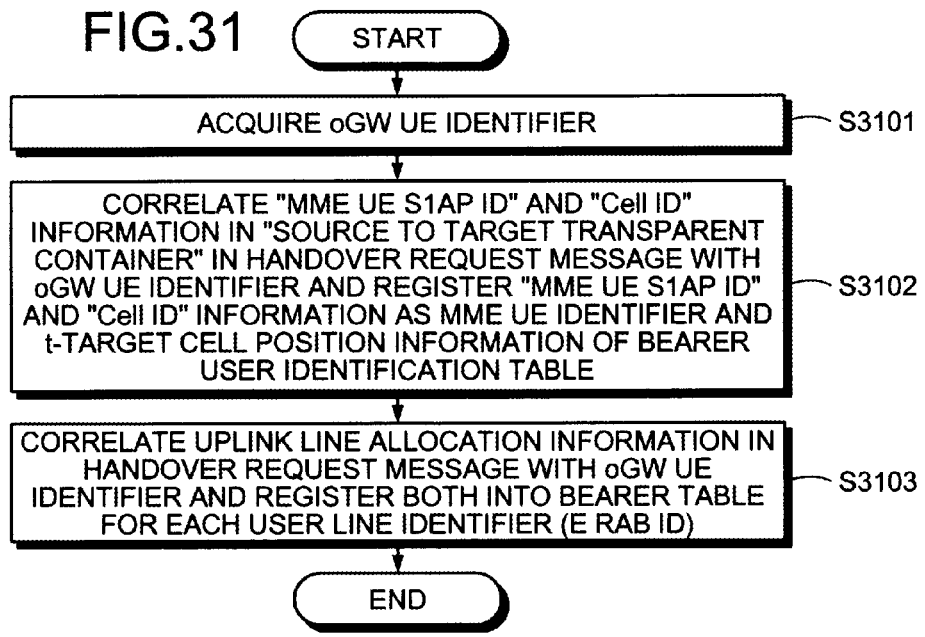
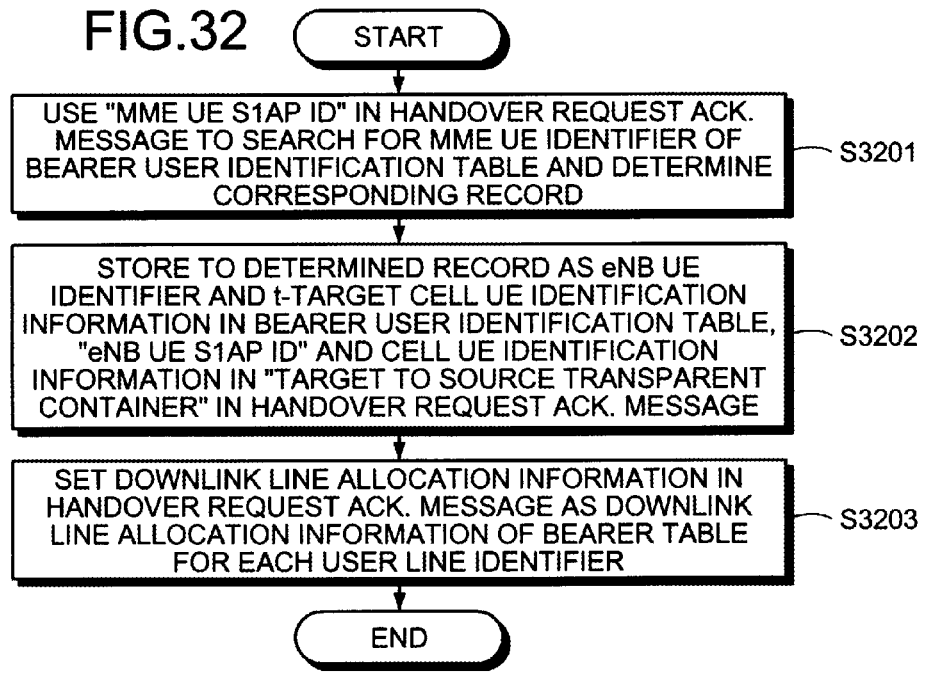

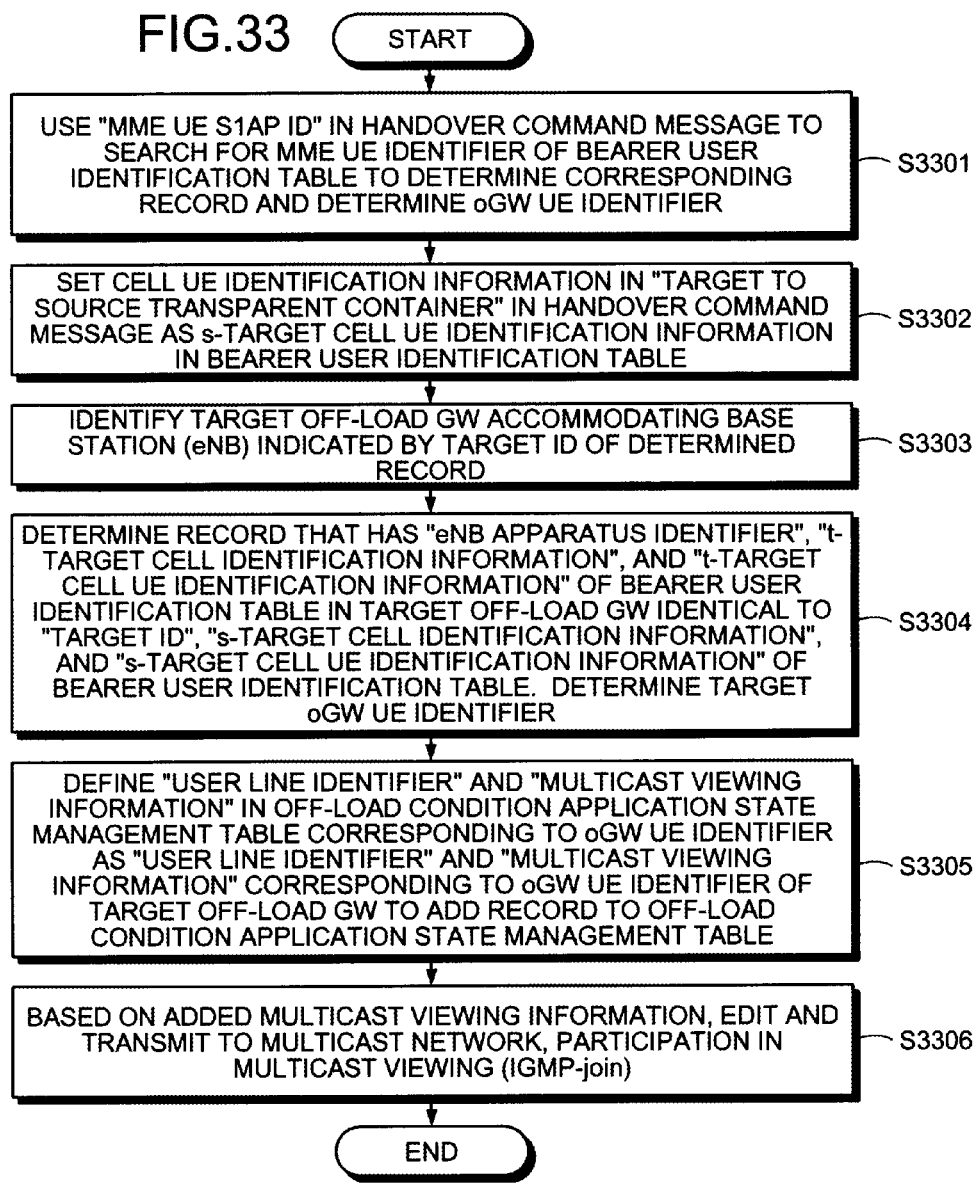

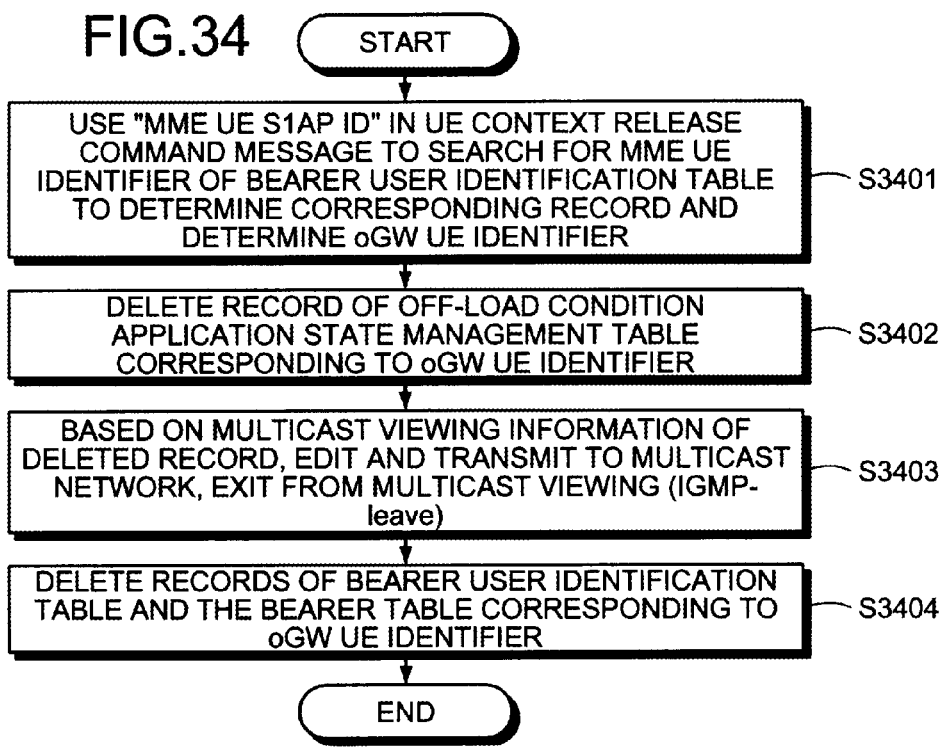

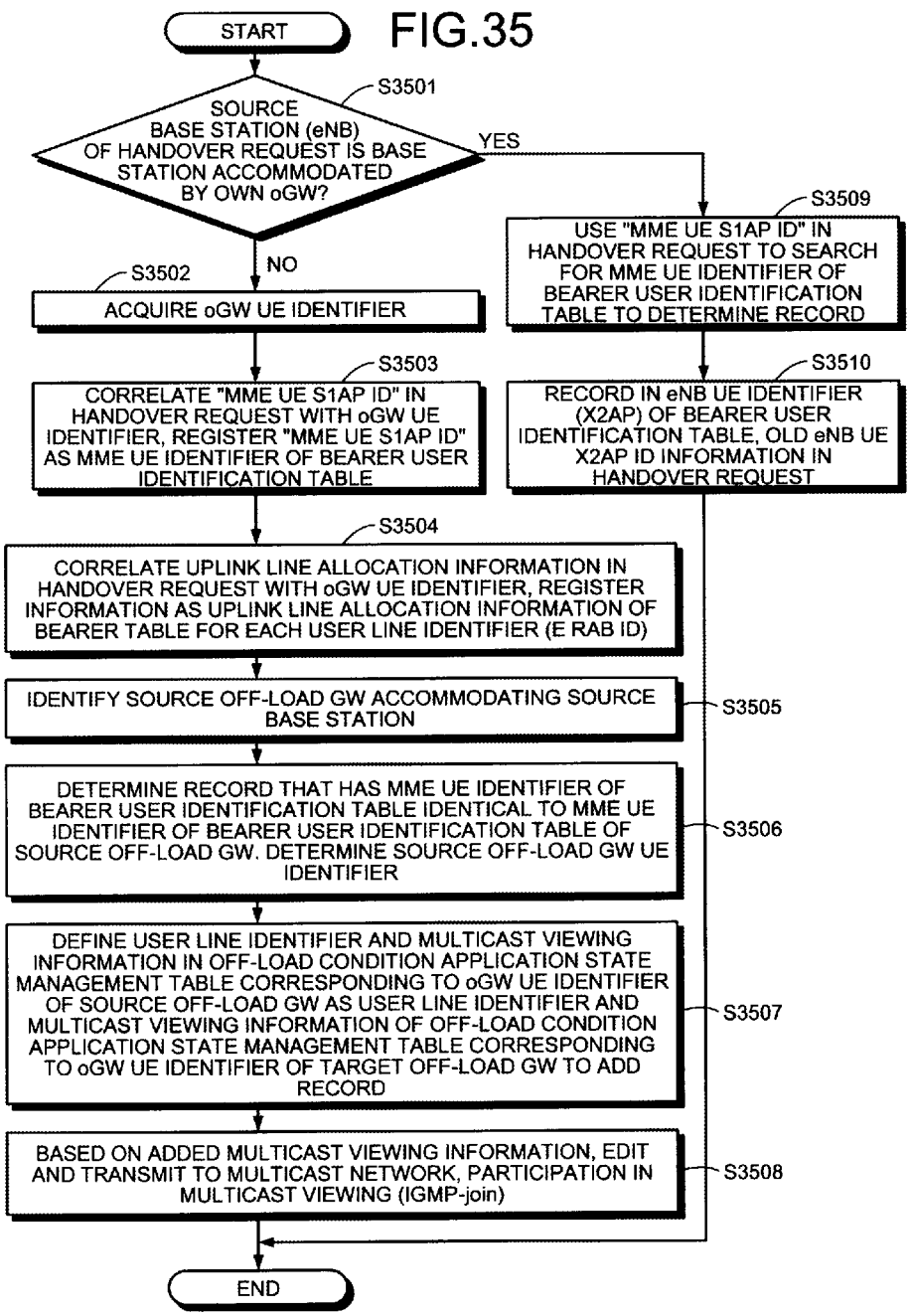

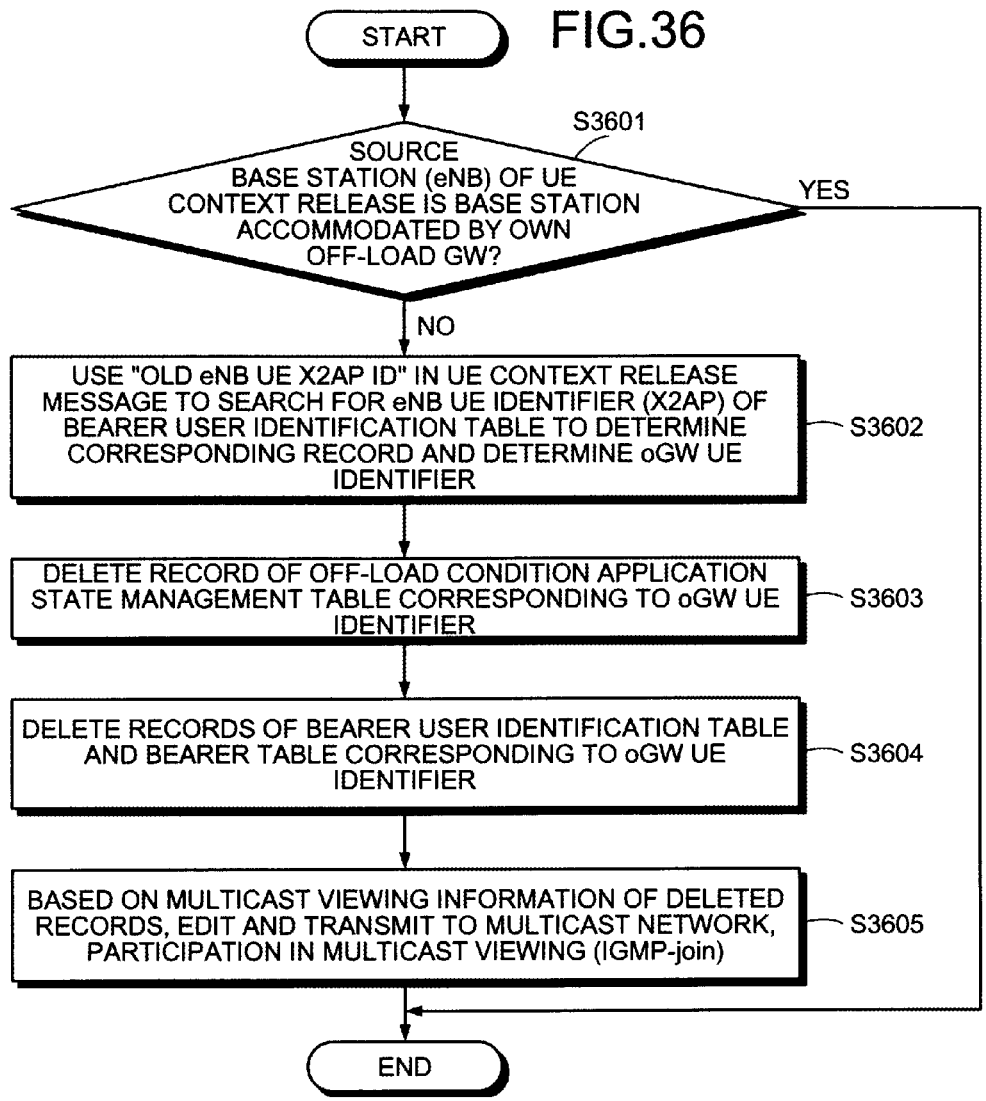

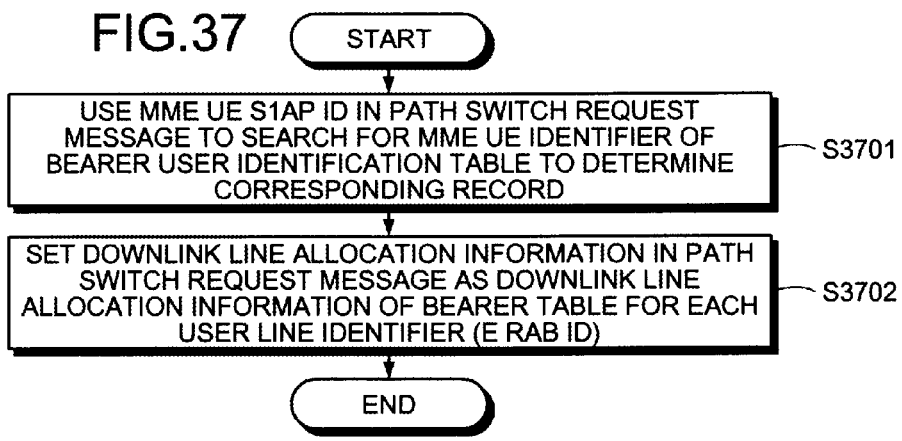
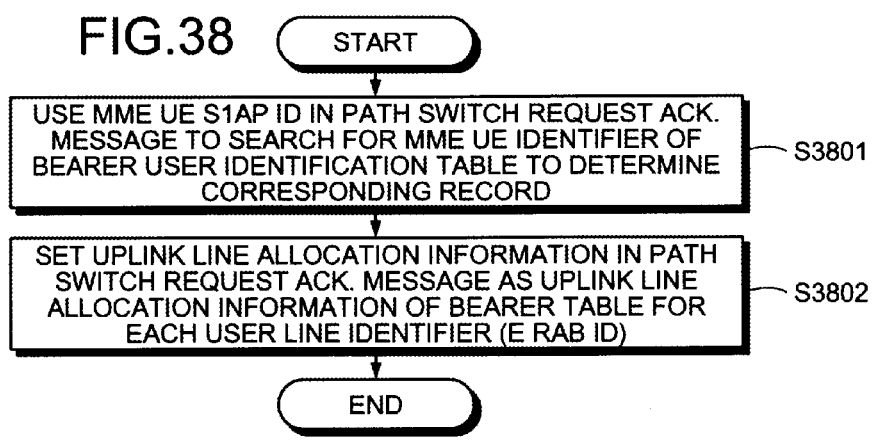
FIG.39
oGW ACCOMMODATION TABLE
| eNB IDENTIFIER | eNB ADDRESS INFORMATION | ACCOMMODATING oGW INFORMATION |
|---|---|---|
| eNB#1 | eNB#1 Address | oGW#1 |
| eNB#2 | eNB#2 Address | oGW#2 |
| eNB#3 | eNB#3 Address | oGW#2 |
| eNB#4 | eNB#4 Address | oGW#1 |
| | | |
| | | |
| | | |

FIG.40

BEARER USER IDENTIFICATION TABLE (1/2) — 321A

| oGW UE IDENTIFIER | MME UE IDENTIFIER | MME APPARATUS IDENTIFIER | eNB UE IDENTIFIER (S1AP) | eNB UE IDENTIFIER (X2AP) | eNB APPARATUS IDENTIFIER |
|---|---|---|---|---|---|
| 8000 | MME#1 UE S1AP ID#x | MME#1 | eNB UE S1AP ID#x | | eNB#1 |
| | | | | | |
| | | | | | |
| | | | | | |
| | | | | | |
| | | | | | |
| | | | | | |

BEARER USER IDENTIFICATION TABLE (2/2) — 321A

| oGW UE IDENTIFIER | T-Target CellID inf | T-C-RNTI inf | Target ID | S-Target CellID inf | S-C-RNTI inf |
|---|---|---|---|---|---|
| 8000 | | | | | |
| | | | | | |
| | | | | | |
| | | | | | |
| | | | | | |
| | | | | | |
| | | | | | |

BEARER TABLE — 321B

| oGW UE IDENTIFIER | USER LINE IDENTIFIER | UPLINK LINE ALLOCATION INFORMATION | | DOWNLINK LINE ALLOCATION INFORMATION | |
|---|---|---|---|---|---|
| 8000 | 1 | TEID#SGW-u_1 | SGW#1 | eNB-TEID#1 | eNB#1 |
| 8000 | 2 | TEID#SGW-u_2 | SGW#1 | eNB-TEID#2 | eNB#1 |
| | | | | | |
| | | | | | |
| | | | | | |
| | | | | | |
| | | | | | |

FIG.41

| oGW UE IDENTIFIER | USER LINE IDENTIFIER (E RAB ID) | MULTICAST VIEWING INFORMATION |
|---|---|---|
|  |  |  |
| 8000 | 2 | Multicast Addr#m |
|  |  |  |
|  |  |  |

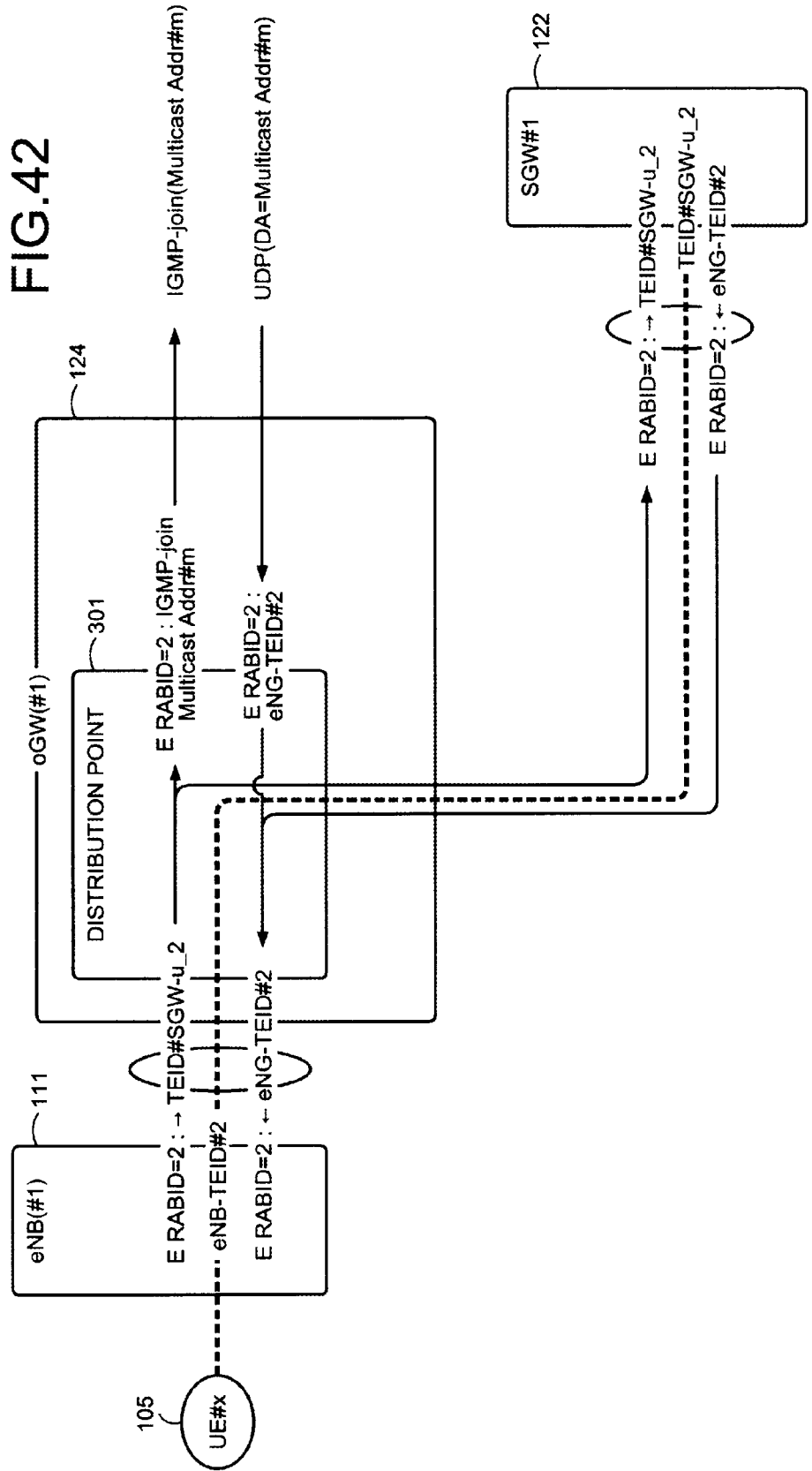

FIG.43

Source oGW(=oGW#1)

BEARER USER IDENTIFICATION TABLE (1/2) — 321A

| oGW UE IDENTIFIER | MME UE IDENTIFIER | MME APPARATUS IDENTIFIER | eNB UE IDENTIFIER (S1AP) | eNB UE IDENTIFIER (X2AP) | eNB APPARATUS IDENTIFIER |
|---|---|---|---|---|---|
| 8000 | MME UE S1AP ID#x | MME#1 | eNB UE S1AP ID#x | | eNB#1 |
| | | | | | |
| | | | | | |

BEARER USER IDENTIFICATION TABLE (2/2) — 321A

SET BY INTERCEPTION OF Handover Required → Target ID, S-Target CellID inf
SET BY INTERCEPTION OF Handover Command → S-C-RNTI inf

| oGW UE IDENTIFIER | T-Target CellID inf | T-C-RNTI inf | Target ID | S-Target CellID inf | S-C-RNTI inf |
|---|---|---|---|---|---|
| 8000 | | | eNB#2 | CellID#x | C-RNTI#x |
| | | | | | |
| | | | | | |

BEARER TABLE — 321B

| oGW UE IDENTIFIER | USER LINE IDENTIFIER | UPLINK LINE ALLOCATION INFORMATION | | DOWNLINK LINE ALLOCATION INFORMATION | |
|---|---|---|---|---|---|
| 8000 | 1 | TEID#SGW-u1 | SGW#1 | eNB-TEID#1 | eNB#1 |
| 8000 | 2 | TEID#SGW-u2 | SGW#1 | eNB-TEID#2 | eNB#1 |
| | | | | | |

Target oGW(=oGW#2)

BEARER USER IDENTIFICATION TABLE (1/2) — 321A

| oGW UE IDENTIFIER | MME UE IDENTIFIER | MME APPARATUS IDENTIFIER | eNB UE IDENTIFIER (S1AP) | eNB UE IDENTIFIER (X2AP) | eNB APPARATUS IDENTIFIER |
|---|---|---|---|---|---|
| 8102 | MME#2 UE S1AP ID#x | MME#2 | eNB#2 UE S1AP ID#x | | eNB#2 |
| | | | | | |
| | | | | | |

BEARER USER IDENTIFICATION TABLE (2/2) — 321A

| oGW UE IDENTIFIER | T-Target CellID inf | T-C-RNTI inf | Target ID | S-Target CellID inf | S-C-RNTI inf |
|---|---|---|---|---|---|
| 8102 | CellID#x | C-RNTI#x | | | |
| | | | | | |
| | | | | | |

SET BY INTERCEPTION OF Handover Request → T-Target CellID inf
SET BY INTERCEPTION OF Handover Request Ack. → T-C-RNTI inf

BEARER TABLE — 321B

| oGW UE IDENTIFIER | USER LINE IDENTIFIER | UPLINK LINE ALLOCATION INFORMATION | | DOWNLINK LINE ALLOCATION INFORMATION | |
|---|---|---|---|---|---|
| | | | | | |
| 8102 | 1 | TEID#SGW-u21 | SGW#2 | eNB-TEID#21 | eNB#2 |
| 8102 | 2 | TEID#SGW-u22 | SGW#2 | eNB-TEID#22 | eNB#2 |

FIG.44

Source oGW(oGW#1)

OFF-LOAD CONDITION APPLICATION
STATE MANAGEMENT TABLE                           322

| oGW UE IDENTIFIER | USER LINE IDENTIFIER (E RAB ID) | MULTICAST VIEWING INFORMATION |
|---|---|---|
|  |  |  |
| 8000 | 2 | Multicast Addr#m |
|  |  |  |
|  |  |  |

Target oGW(oGW#2)

OFF-LOAD CONDITION APPLICATION
STATE MANAGEMENT TABLE                           322

| oGW UE IDENTIFIER | USER LINE IDENTIFIER (E RAB ID) | MULTICAST VIEWING INFORMATION |
|---|---|---|
|  |  |  |
| 8102 | 2 | Multicast Addr#m |
|  |  |  |
|  |  |  |

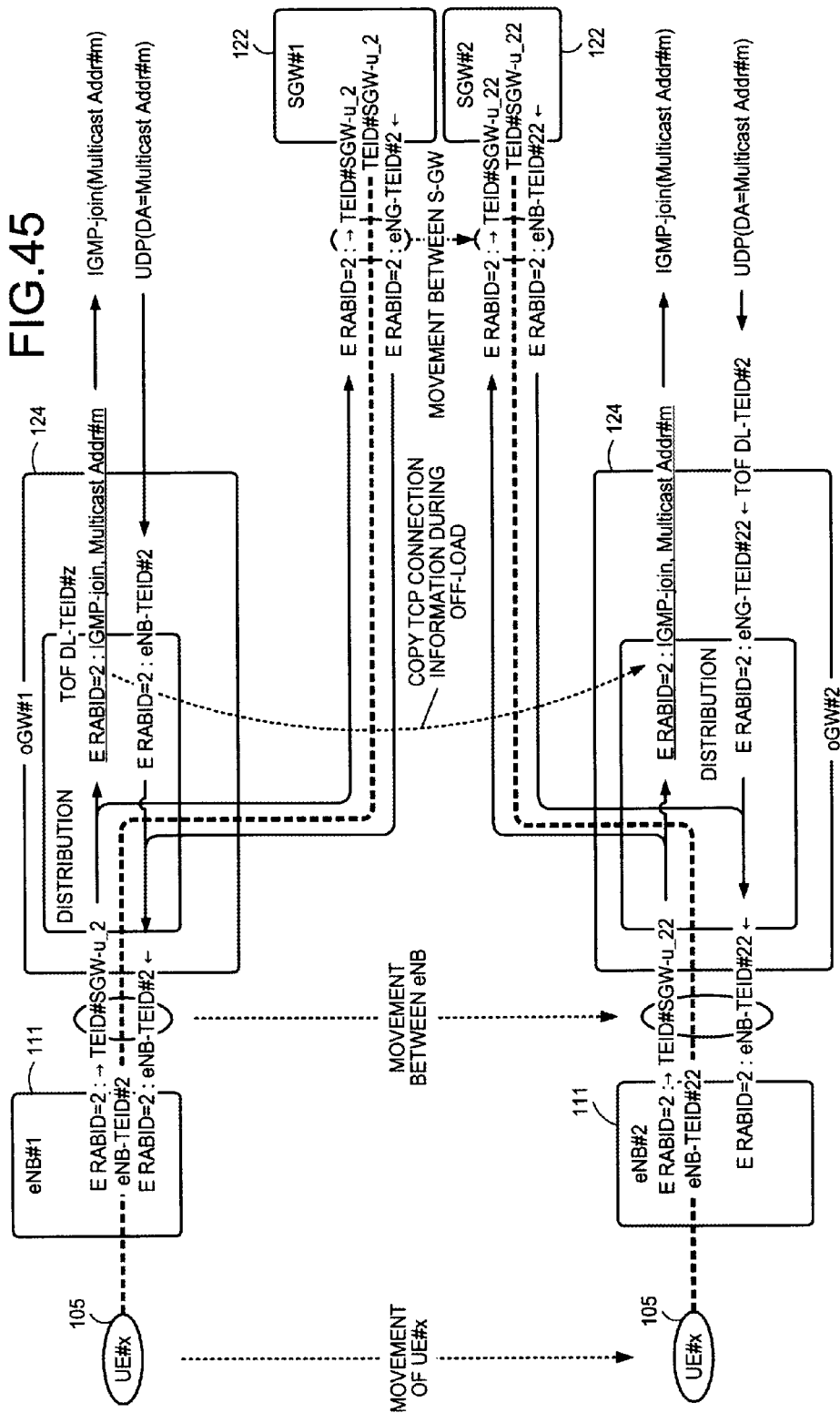

FIG.46

Source oGW(=oGW#1)

BEARER USER IDENTIFICATION TABLE (1/2) — 321A

| oGW UE IDENTIFIER | MME UE IDENTIFIER | MME APPARATUS IDENTIFIER | eNB UE IDENTIFIER (S1AP) | eNB UE IDENTIFIER (X2AP) | eNB APPARATUS IDENTIFIER |
|---|---|---|---|---|---|
| | | | | | |
| | | | | | |
| | | | | | |

BEARER USER IDENTIFICATION TABLE (2/2) — 321A

| oGW UE IDENTIFIER | T-Target CellID inf | T-C-RNTI inf | Target ID | S-Target CellID inf | S-C-RNTI inf |
|---|---|---|---|---|---|
| | | | | | |
| | | | | | |
| | | | | | |

BEARER TABLE — 321B

| oGW UE IDENTIFIER | USER LINE IDENTIFIER | UPLINK LINE ALLOCATION INFORMATION | DOWNLINK LINE ALLOCATION INFORMATION |
|---|---|---|---|
| | | | |
| | | | |
| | | | |
| | | | |

---

Target oGW(=oGW#2)

BEARER USER IDENTIFICATION TABLE (1/2) — 321A

| oGW UE IDENTIFIER | MME UE IDENTIFIER | MME APPARATUS IDENTIFIER | eNB UE IDENTIFIER (S1AP) | eNB UE IDENTIFIER (X2AP) | eNB APPARATUS IDENTIFIER |
|---|---|---|---|---|---|
| 8102 | MME#1 UE S1AP ID#x | MME#1 | eNB#2 UE S1AP ID#x | | eNB#2 |
| | | | | | |

BEARER USER IDENTIFICATION TABLE (2/2) — 321A

| oGW UE IDENTIFIER | T-Target CellID inf | T-C-RNTI inf | Target ID | S-Target CellID inf | S-C-RNTI inf |
|---|---|---|---|---|---|
| 8102 | | | | | |
| | | | | | |

BEARER TABLE — 321B

| oGW UE IDENTIFIER | USER LINE IDENTIFIER | UPLINK LINE ALLOCATION INFORMATION | | DOWNLINK LINE ALLOCATION INFORMATION | |
|---|---|---|---|---|---|
| 8102 | 1 | TEID#SGW-u21 | SGW#2 | eNB-TEID#21 | eNB#2 |
| 8102 | 2 | TEID#SGW-u22 | SGW#2 | eNB-TEID#22 | eNB#2 |

FIG.47

Source oGW(oGW#1)

OFF-LOAD CONDITION APPLICATION STATE MANAGEMENT TABLE 322

| oGW UE IDENTIFIER | USER LINE IDENTIFIER (E RAB ID) | MULTICAST VIEWING INFORMATION |
|---|---|---|
|  |  |  |
|  |  |  |
|  |  |  |
|  |  |  |

Target oGW(oGW#2)

OFF-LOAD CONDITION APPLICATION STATE MANAGEMENT TABLE 322

| oGW UE IDENTIFIER | USER LINE IDENTIFIER (E RAB ID) | MULTICAST VIEWING INFORMATION |
|---|---|---|
|  |  |  |
| 8102 | 2 | Multicast Addr#m |
|  |  |  |
|  |  |  |

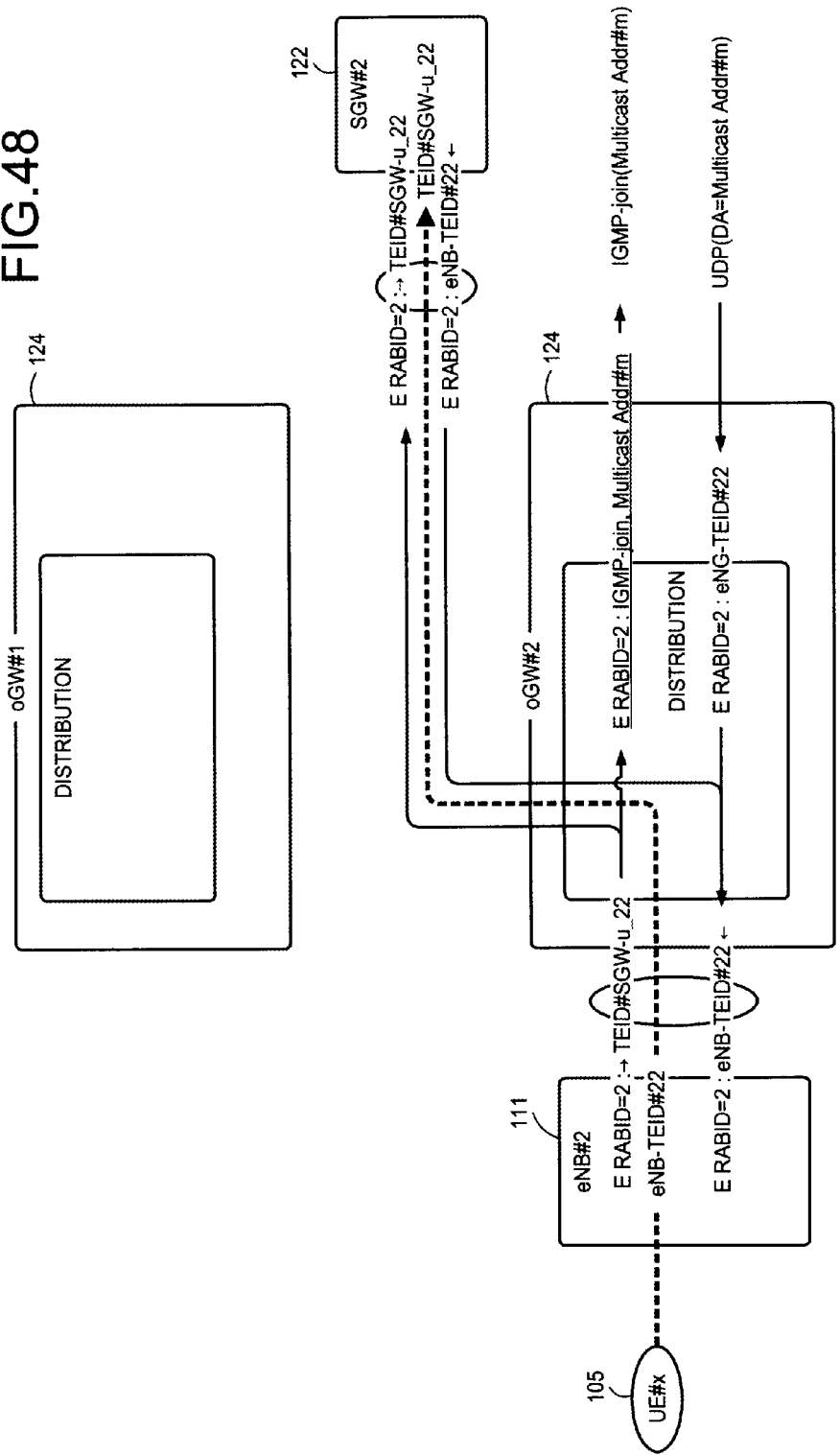

FIG.49

Source oGW(=oGW#1)

BEARER USER IDENTIFICATION TABLE (1/2) — 321A

| oGW UE IDENTIFIER | MME UE IDENTIFIER | MME APPARATUS IDENTIFIER | eNB UE IDENTIFIER (S1AP) | eNB UE IDENTIFIER (X2AP) | eNB APPARATUS IDENTIFIER |
|---|---|---|---|---|---|
| 8000 | MME#1 UE S1AP ID#x | MME#1 | eNB#1 UE S1AP ID#x | eNB#1 UE X2AP ID#x | eNB#1 |
|  |  |  |  |  |  |
|  |  |  |  |  |  |

BEARER USER IDENTIFICATION TABLE (2/2) — 321A

| oGW UE IDENTIFIER | T-Target CellID inf | T-C-RNTI inf | Target ID | S-Target CellID inf | S-C-RNTI inf |
|---|---|---|---|---|---|
| 8000 |  |  |  |  |  |
|  |  |  |  |  |  |
|  |  |  |  |  |  |

BEARER TABLE — 321B

| oGW UE IDENTIFIER | USER LINE IDENTIFIER | UPLINK LINE ALLOCATION INFORMATION | | DOWNLINK LINE ALLOCATION INFORMATION | |
|---|---|---|---|---|---|
| 8000 | 1 | TEID#SGW-u1 | SGW#1 | eNB-TEID#1 | eNB#1 |
| 8000 | 2 | TEID#SGW-u2 | SGW#1 | eNB-TEID#2 | eNB#1 |
|  |  |  |  |  |  |
|  |  |  |  |  |  |

Target oGW(=oGW#2)

BEARER USER IDENTIFICATION TABLE (1/2) — 321A

| oGW UE IDENTIFIER | MME UE IDENTIFIER | MME APPARATUS IDENTIFIER | eNB UE IDENTIFIER (S1AP) | eNB UE IDENTIFIER (X2AP) | eNB APPARATUS IDENTIFIER |
|---|---|---|---|---|---|
| 8102 | MME#1 UE S1AP ID#x | MME#1 | eNB#2 UE S1AP ID#x |  | eNB#2 |
|  |  |  |  |  |  |
|  |  |  |  |  |  |

BEARER USER IDENTIFICATION TABLE (2/2) — 321A

| oGW UE IDENTIFIER | T-Target CellID inf | T-C-RNTI inf | Target ID | S-Target CellID inf | S-C-RNTI inf |
|---|---|---|---|---|---|
| 8102 |  |  |  |  |  |
|  |  |  |  |  |  |
|  |  |  |  |  |  |

BEARER TABLE — 321B

| oGW UE IDENTIFIER | USER LINE IDENTIFIER | UPLINK LINE ALLOCATION INFORMATION | | DOWNLINK LINE ALLOCATION INFORMATION | |
|---|---|---|---|---|---|
| 8102 | 1 | TEID#SGW-u21 | SGW#2 | eNB-TEID#21 | eNB#2 |
| 8102 | 2 | TEID#SGW-u22 | SGW#2 | eNB-TEID#22 | eNB#2 |
|  |  |  |  |  |  |

FIG.50

Source oGW(oGW#1)

OFF-LOAD CONDITION APPLICATION STATE MANAGEMENT TABLE 322

| oGW UE IDENTIFIER | USER LINE IDENTIFIER (E RAB ID) | MULTICAST VIEWING INFORMATION |
|---|---|---|
|  |  |  |
| 8000 | 2 | Multicast Addr#m |
|  |  |  |
|  |  |  |

Target oGW(oGW#2)

OFF-LOAD CONDITION APPLICATION STATE MANAGEMENT TABLE 322

| oGW UE IDENTIFIER | USER LINE IDENTIFIER (E RAB ID) | MULTICAST VIEWING INFORMATION |
|---|---|---|
|  |  |  |
| 8102 | 2 | Multicast Addr#m |
|  |  |  |
|  |  |  |

FIG.53

Source oGW(oGW#1)

OFF-LOAD CONDITION APPLICATION STATE MANAGEMENT TABLE 322

| oGW UE IDENTIFIER | USER LINE IDENTIFIER (E RAB ID) | MULTICAST VIEWING INFORMATION |
|---|---|---|
| | | |
| | | |
| | | |
| | | |

Target oGW(oGW#2)

OFF-LOAD CONDITION APPLICATION STATE MANAGEMENT TABLE 322

| oGW UE IDENTIFIER | USER LINE IDENTIFIER (E RAB ID) | MULTICAST VIEWING INFORMATION |
|---|---|---|
| | | |
| 8102 | 2 | Multicast Addr#m |
| 8102 | 2 | Multicast Addr#n |
| | | |

FIG.55

Source oGW(oGW#1)

OFF-LOAD CONDITION APPLICATION STATE MANAGEMENT TABLE    322

| oGW UE IDENTIFIER | USER LINE IDENTIFIER (E RAB ID) | MULTICAST VIEWING INFORMATION |
|---|---|---|
|  |  |  |
|  |  |  |
|  |  |  |
|  |  |  |

Target oGW(oGW#2)    DELETION

OFF-LOAD CONDITION APPLICATION STATE MANAGEMENT TABLE    322

| oGW UE IDENTIFIER | USER LINE IDENTIFIER (E RAB ID) | MULTICAST VIEWING INFORMATION |
|---|---|---|
|  |  |  |
| 8102 | 2 | Multicast Addr#m |
| 8102 | 2 | Multicast Addr#n |
|  |  |  |

FIG.57

Source oGW(=oGW#1) /124

BEARER USER IDENTIFICATION TABLE (1/2) /321A

| oGW UE IDENTIFIER | MME UE IDENTIFIER | MME APPARA-TUS IDENTIFIER | eNB UE IDENTIFIER (S1AP) | eNB UE IDEN-TIFIER (X2AP) | eNB APPARA-TUS IDENTIFIER |
|---|---|---|---|---|---|
| | | | | | |
| | | | | | |

BEARER USER IDENTIFICATION TABLE (2/2) /321A

| oGW UE IDENTIFIER | T-Target CellID inf | T-C-RNTI inf | Target ID | S-Target CellID inf | S-C-RNTI inf |
|---|---|---|---|---|---|
| | | | | | |
| | | | | | |

BEARER TABLE /321B

| oGW UE IDENTIFIER | USER LINE IDENTIFIER | UPLINK LINE ALLOCATION INFORMATION | DOWNLINK LINE ALLOCATION INFORMATION |
|---|---|---|---|
| | | | |
| | | | |
| | | | |

Target oGW(=oGW#2) /124

BEARER USER IDENTIFICATION TABLE (1/2) /321A

| oGW UE IDENTIFIER | MME UE IDENTIFIER | MME APPARA-TUS IDENTIFIER | eNB UE IDENTIFIER (S1AP) | eNB UE IDEN-TIFIER (X2AP) | eNB APPARA-TUS IDENTIFIER |
|---|---|---|---|---|---|
| 8102 | MME#1 UE S1AP ID#x | MME#1 | eNB#2 UE S1AP ID#x | | eNB#2 |

BEARER USER IDENTIFICATION TABLE (2/2) /321A

| oGW UE IDENTIFIER | T-Target CellID inf | T-C-RNTI inf | Target ID | S-Target CellID inf | S-C-RNTI inf |
|---|---|---|---|---|---|
| 8102 | | | | | |

BEARER TABLE /321B

| oGW UE IDENTIFIER | USER LINE IDENTIFIER | UPLINK LINE ALLOCATION INFORMATION | | DOWNLINK LINE ALLOCATION INFORMATION | |
|---|---|---|---|---|---|
| 8102 | 1 | TEID#SGW-u21 | SGW#2 | eNB-TEID#21 | eNB#2 |
| 8102 | 2 | TEID#SGW-u22 | SGW#2 | eNB-TEID#22 | eNB#2 |

OFF-LOAD APPARATUS, NETWORK SYSTEM, AND HANDOVER METHOD OF MULTICAST TRAFFIC

CROSS REFERENCE TO RELATED APPLICATIONS

This application is based upon and claims the benefit of priority of the prior Japanese Patent Application No. 2012-166993, filed on Jul. 27, 2012, the entire contents of which are incorporated herein by reference.

FIELD

The embodiments discussed herein are related to an off-load apparatus, a network system, and a handover method for multicast traffic enabling a freely moving mobile station to view multicast delivered contents.

BACKGROUND

Long Term Evolution/Evolved Packet Core (LTE/EPC) is standardized by 3GPP as a next-generation mobile communication system following the third generation mobile telephone network (3G mobile system). LTE/EPC includes an LTE network (a wireless access network conforming to LTE, referred to as eUTRAN) and an EPC network (also referred to as System Architecture Evolution (SAE)) as a core network. The EPC network is connected via an IP multimedia subsystem (IMS) network to an Internet protocol (IP) network (packet network). The IP network is an Internet service provider (ISP) network (Internet) or an intranet, for example.

A mobile station (mobile terminal, referred to as user equipment (UE)) can connect to the EPC network via the LTE network acting as a mobile network, for example, and is connected to the IP network via the EPC network and the IMS network. A mobile terminal can access various servers and terminal apparatuses connected to the IP network to receive various packet communication services (e.g., web services, Voice over IP (VoIP), and IPTV broadcasting).

The EPC network has multiple nodes such as mobility management entity (MME), serving gateway (S-GW), packet data network gateway (P-GW), and policy and charging rule function (PCRF). A mobile terminal is connected via S-GW and P-GW to the IMS network, enabling access to the IP network.

A mobile terminal performs communication using a communication line set based on a bearer in the mobile network. During movement of the mobile terminal, a handover function between transmitting apparatuses (S-GW, P-GW) in the mobile network enables a predetermined communication service to be continued without interruption of the communication.

Communication services include IPTV broadcasting and IP radio broadcasting, in which multicast packets are transmitted to multiple mobile terminals participating in viewing. A technique is disclosed for continuing communication in a multicast service such as IPTV broadcasting during movement of a mobile terminal. For example, a relay apparatus is disposed in the IP network and connected through a logical tunnel so as to deliver unicast data via the tunnel while multicast data is relayed by a multicast delivery network and delivered to users without going through the tunnel. In another technique, a multicast delivery proxy apparatus in a public network converts a destination address into a multicast address to perform broadcast delivery to users without using a relay apparatus. In yet another technique, in response to "position information registration" from a mobile terminal, a viewing state for the mobile terminal is changed in a handover-source apparatus and a handover-destination apparatus. In a further technique, in response to detection of a handover condition by a mobile terminal, the mobile terminal sets a line for multicast reception addressed to an off-load apparatus in the vicinity of a handover-destination base station (eNB) and, via this line, the mobile terminal participates in multicast viewing (see, for example, Japanese Laid-Open Patent Publication Nos. 2002-374276, 2001-177564, and 2007-228450).

In a configuration with a transmitting apparatus (P-GW) delivering IPTV broadcasting to mobile terminals through a communication line for viewing, the IPTV broadcast can continuously be viewed without interruption during movement of a mobile terminal. However, in this technique, respective communication lines are set for mobile terminals from the transmitting apparatus (P-GW) to a base station (eNB) and multicast packets are transmitted to each of the communication lines. This is the same even when the same IPTV broadcast is viewed by multiple mobile terminals, increasing traffic of an EPC network. Particularly, as the number of mobile terminals increases, the traffic significantly increases. For example, if ten mobile terminals are present, even when multicast packets have the same contents, ten communication lines are necessary from P-GW to the mobile terminals and the traffic carrying the same contents must go through each of the ten communication lines at the same time (see, e.g., Japanese Laid-Open Patent Publication No. 2002-374276).

In a configuration changing a mobile terminal viewing state a at a handover-source apparatus and a handover-destination apparatus, the position registration of the mobile terminal is performed after the mobile terminal completes a handover process and therefore, the multicast packet communication is interrupted at the time of handover, causing a problem of interruption in delivery of IPTV broadcasting (see, e.g., Japanese Laid-Open Patent Publication No. 2001-177564).

On the other hand, in the technique in which in response to detection of a handover condition by a mobile terminal, the mobile terminal sets a line for multicast reception addressed to an off-load apparatus in the vicinity of a handover-destination base station (eNB), the IPTV broadcast can continuously be viewed without interruption during movement of the mobile terminal. However, in this technique, a new respective communication lines are set for mobile terminals from the transmitting apparatus (P-GW) in the vicinity of a destination to the base station (eNB) and transmission for participating in multicast viewing is performed through each of the new communication lines. This is the same even when the same IPTV broadcast is viewed with multiple mobile terminals, increasing traffic of a wireless section network. Particularly, as the number of moving mobile terminals increases, the traffic of the wireless section network significantly increases. For example, even when multicast packets have the same contents, ten mobile terminals require reestablishment and participation in viewing of ten new communication lines from P-GW in the vicinity of a destination to the mobile terminals. Additionally, a communication line to a transmission device (P-GW) in the vicinity of an original location must be disconnected (see, e.g., Japanese Laid-Open Patent Publication No. 2007-228450).

As described above, when a multicast service is executed for mobile terminals, conventional techniques cannot achieve both continuous viewing during movement of a mobile terminal and suppression of traffic increases in the EPC network.

SUMMARY

According to an aspect of an embodiment, an off-load apparatus is disposed between a core network accommodating base stations and the base stations capable of connection with a mobile station. The off-load apparatus includes a storage unit that stores line information and multicast viewing information of the mobile station when the mobile station performs multicast communication of an off-load object via the off-load apparatus; a transferring unit that transfers the line information and the multicast viewing information of the mobile station to another off-load apparatus that is an handover destination when the mobile station moves during the multicast communication; and a control unit that executes a process of participating in multicast viewing on behalf of the mobile station when the off-load apparatus acts as a handover-destination apparatus, based on the multicast viewing information transferred from a handover-source off-load apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a functional block diagram of the off-load GW;

FIG. 4 is a diagram for explaining X2-based handover operation of off-load traffic by the off-load GW;

FIG. 5 is a diagram for explaining S1-based handover operation of off-load traffic by an off-load GW;

FIG. 6 is a sequence diagram of an example of activation and off-load processes of a mobile terminal;

FIG. 7A is a sequence diagram of a process example of S1-based handover;

FIG. 7B is a sequence diagram of a process example of X2-based handover;

FIG. 8 is a chart of a data structure example of off-load condition application state data;

FIG. 9 is a chart of a data structure example of an uplink GTP-u packet from a base station to an S-GW;

FIG. 10 is a chart of a data structure example of a downlink GTP-u packet from the S-GW to the base station;

FIG. 11 is a chart of a configuration example of a packet utilized when an off-load object uplink packet is transmitted from the off-load GW of an IPTV broadcast viewing participation point to the multicast network;

FIG. 12 is a chart of a configuration example of a packet arriving at the off-load GW of the IPTV broadcast viewing participation point via a multicast network from a IPTV broadcast station;

FIG. 14 is a chart of a configuration example of an Initial Context Setup Request message transmitted from an MME to a base station at the time of activation of a mobile terminal;

FIG. 15 is a chart of a configuration example of an Initial Context Setup Response message that is a response message to the Initial Context Setup Request message;

FIG. 16 is a chart of a configuration example of a Handover Required message transmitted from a mobile terminal to a source MME at the time of the S1-based handover of the mobile terminal;

FIG. 17 is a chart of a configuration example of a Handover Request message transmitted from a target MME to a target base station at the time of the S1-based handover;

FIG. 18 is a chart of a configuration example of a Handover Request Ack. message returned from the target base station to the target MME in response to the Handover Request message;

FIG. 19 is a chart of a configuration example of a Handover Command message transmitted from the source MME to a source base station;

FIG. 20 is a chart of a configuration example of a UE Context Release Command message transmitted from the source MME 121 to the source base station 111;

FIG. 21 is a chart of a configuration example of an X2AP: Handover Request message transferred from the source base station via a target off-load GW to the target base station in the X2-based handover;

FIG. 22 is a chart of a configuration example of an X2AP: Handover Request Ack. message that is a response message to the X2AP: Handover Request message;

FIG. 23 is a chart of a configuration example of an X2AP: UE context Release message;

FIG. 24 is a chart of a configuration example of a Path Switch Request message transferred from the target base station to the MME in the X2-based handover;

FIG. 25 is a chart of a Path Switch Request Ack. message transmitted from the MME to the target base station as a response to the Path Switch Request message;

FIG. 26 is a flowchart of process details when the off-load GW of the distribution point receives an uplink GTP-u packet from the base station to the S-GW;

FIG. 27 is a flowchart of process details when the off-load GW of the IPTV broadcast viewing participation point receives a multicast packet of IPTV broadcasting from the multicast network;

FIG. 28 is a flowchart of process details when the Initial Context Setup Request message (MME→eNB) is intercepted;

FIG. 29 is a flowchart of process details when the Initial Context Setup Response message (eNB→MME) is intercepted;

FIG. 30 is a flowchart of process details when the Handover Required message (source eNB→source MME) is intercepted at the time of the S1-based handover;

FIG. 31 is a flowchart of process details when the Handover Request message (target MME→target eNB) is intercepted at the time of the S1-based handover;

FIG. 32 is a flowchart of process details when the Handover Request Ack. message (target eNB→target MME) is intercepted at the time of the S1-based handover;

FIG. 33 is a flowchart of process details when the Handover Command message (source MME→source eNB) is intercepted at the time of the S1-based handover;

FIG. 34 is a flowchart of process details when a UE Context Release Command message (source MME→source eNB) is intercepted at the time of the S1-based handover;

FIG. 35 is a flowchart of process details when the X2AP: Handover Request message (source eNB→target eNB) is intercepted at the time of the X2-based handover;

FIG. 36 is a flowchart of process details when the X2AP: UE Context Release message (target eNB→source eNB) is intercepted at the time of the X2-based handover;

FIG. 37 is a flowchart of process details when a Path Switch Request message (target eNB→MME) is intercepted at the time of the X2-based handover;

FIG. 38 is a flowchart of process details when a Path Switch Request Ack. message (MME→target eNB) is intercepted at the time of the X2-based handover;

FIG. 39 is a chart of an oGW accommodation table of accommodation of a base station in an off-load GW;

FIG. 40 is a chart of an information registration state in the bearer state management table;

FIG. 41 is a chart of a state when multicast viewing information is registered in the off-load condition application state management table;

FIG. 42 is a diagram of a flow of traffic due to off-load condition application after the start of IPTV viewing;

FIG. 43 is a chart of an example of takeover of the off-load condition application state in the S1-based handover between off-load GWs;

FIG. 44 is a chart of an example of takeover of the off-load condition application state in the S1-based handover between off-load GWs;

FIG. 45 is a chart of a flow of traffic at the time of takeover of the off-load condition application state in the S1-based handover between off-load GW apparatuses;

FIG. 46 is a chart of the bearer state management table in the off-load condition application state while IPTV broadcast viewing is maintained after completion of the S1-based handover;

FIG. 47 is a chart of the off-load condition application state management table in the off-load condition application state while IPTV broadcast viewing is maintained after completion of the S1-based handover;

FIG. 48 is a chart of a flow of traffic in the off-load condition application state during IPTV broadcast viewing after completion of the S1-based handover;

FIG. 49 is a chart of an example of takeover of the off-load condition application state in the X2-based handover between off-load GWs;

FIG. 50 is a chart of an example of takeover of the off-load condition application state in the X2-based handover between off-load GWs;

FIG. 53 is a chart of a change in the off-load condition application state at the start of new IPTV broadcast viewing after handover;

FIG. 55 is a chart of a change in the off-load condition application state at the time of exit from IPTV broadcast viewing after handover;

FIG. 57 is a chart of a change in the off-load condition application state at the time of exit from IPTV broadcast viewing after handover.

DESCRIPTION OF EMBODIMENTS

Preferred embodiments of the disclosed technique will be described in detail with reference to the accompanying drawings. In the following description, multicast traffic is IPTV broadcasting and an IPTV broadcast station performs multicast delivery of an IPTV broadcast program to multiple mobile terminals. When a mobile terminal moves, corresponding off-load gateways execute a portion of a process at the time of handover (such as for participating in multicast viewing) on behalf of the mobile terminal.

Figure 1:
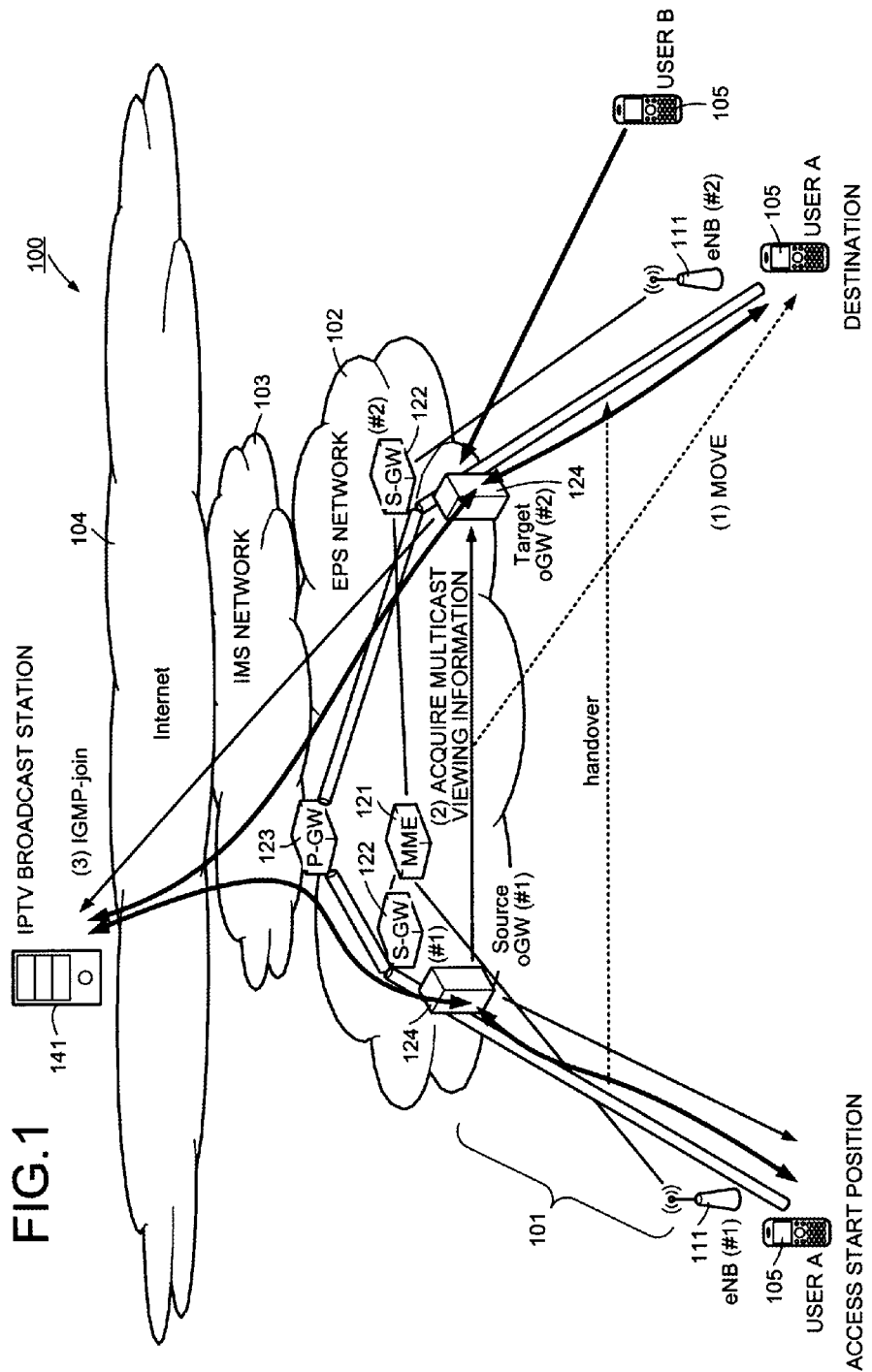
FIG. 1 is a diagram of a network configuration example according to an embodiment.

FIG. 1 is a diagram of a network configuration example according to an embodiment. In FIG. 1, a network system 100 generally includes an LTE network (eUTRAN) 101, an EPC network 102, an IMS network 103, an Internet service provider (ISP) network (Internet) 104, and a multicast network not depicted.

The LTE network 101 is an example of a wireless access network and the EPC network 102 is an example of a core network. The ISP network 104 is an example of a packet network. In FIG. 1, a server 141 of an IPTV broadcast station providing the IPTV broadcast is connected to the ISP network 104.

The LTE network 101 includes a base station 111 called "eNodeB (eNB)" conforming to LTE. The EPC network 102 is an example of a core network. The EPC network 102 can accommodate second-generation (2G, e.g., GSM (registered trademark)), third-generation (3G, e.g., W-CDMA), and 3.5th-generation (HSPA) 3GPP wireless access networks in addition to the eNB. The EPC network 102 can also accommodate non-3GPP wireless access networks such as CDMA2000 and WiFi.

A mobile terminal (UE) 105 wirelessly connects with the base station 111 to access the server 141 of the IPTV broadcast station via the EPC network 102 and the ISP network 104. The mobile terminal 105 can change the connected base station 111 (handover) to continue communication with a communication counterpart according to the movement of the mobile terminal 105. FIG. 1 depicts a moving state of the one mobile terminal 105 of user A.

The EPC network 102 includes various nodes such as a control exchange station (MME) 121, an S-GW 122, a P-GW 123, and a PCRF (not depicted). The MME 121 handles a control plane (C-plane) of network control. The MME 121 performs establishment/release of a bearer (connection between a user and a packet network), and position registration and movement control such as handover of the mobile terminal 105. The MME 121 authenticates a mobile terminal associated with a home subscriber server (HSS, not depicted) in which subscriber information is registered.

The S-GW 122 handles a user plane (U-plane) that is packet data of user data. The S-GW 122 acts as an anchor point of a wireless access network of 3GPP (eNB, 2G/3G) and executes a relaying process for user packet data with the P-GW 123. The P-GW 123 acts as a connection point for a packet network such as the ISP network 104. The P-GW 123 issues an IP address to the mobile terminal 105 and performs user authentication related to connection to the packet network at the time of establishment of a bearer. The P-GW 123 has functions such as Quality-of-Service (QoS) control according to instructions from PCRF, creation of billing data, and a DHCP server. One or more nodes are disposed in the EPC network 102 for each of the nodes such as the MME 121, the S-GW 122, and the P-GW 123.

The base station (e.g., eNodeB) 111 is connected through a U-plane interface called "S1-MME interface" to the MME 121. The base station 111 is connected through an interface called "S1-U interface" to the S-GW 122. The S-GW 122 and the MME 121 are connected through a C-plane interface called "S11 interface". The S-GW 122 and the P-GW 123 are connected through a U-plane interface called "S5" and an interface for the U-plane. The base stations 111 are connected to each other through an interface called "X2 interface".

The EPC network 102 depicted in FIG. 1 also includes one or more off-load apparatuses (hereinafter referred to as off-load gateways (off-load GW, oGW)) 124 acting as a node controlling traffic of multicast viewing during movement of the mobile terminal 105. In the example depicted in FIG. 1, the off-load GW 124 is illustrated as two off-load GWs oGW (#1) and oGW (#2) for a source and a target of handover.

The off-load GW 124 is disposed between the base station 111 and the EPC network 102. Therefore, the off-load GW 124 is disposed on the side of the base station 111 from the S-GW 122 in the EPC network 102. The number of the disposed off-load GWs 124 can be determined as needed. For example, the off-load GW 124 may be disposed for each of the base stations 111.

The off-load GW 124 manages multicast viewing information during viewing of an IPTV broadcast as an off-load condition application state for each line of the mobile terminal 105. In response to handover associated with movement of the mobile terminal 105, the off-load condition application state is taken over from the source off-load GW (#1) 124 to the target oGW (#2) 124.

The off-load GW 124 intercepts a packet of the C-plane transmitted and received between the base station 111 and the S-GW 122. The off-load GW 124 determines off-load object traffic (off-load traffic) among traffic of the U-plane flowing between the base station 111 and the S-GW 122.

Among the off-load GWs 124, the source off-load GW (oGW#1) 124 starting the multicast communication defined as a traffic off-load object manages the multicast viewing information of the traffic off-load object for each multicast communication. As depicted in FIG. 1, (1) as the mobile terminal 105 moves, (2) the source off-load GW (oGW#1) 124 communicates the multicast viewing information of the traffic off-load object to the handover-destination (target) off-load GW (oGW#2) 124. As a result, (3) the handover-destination off-load GW (oGW#2) 124 makes a viewing request (IGMP-join) of the mobile terminal 105 to the server 141 of the IPTV broadcast station on behalf of the mobile terminal 105.

Arrows of FIG. 1 indicate delivery paths of a multicast packet (IPTV broadcasting) in the source and target off-load GWs 124, and the off-load GWs 124 perform the delivery through the multicast network on behalf of the S-GW 122. In FIG. 1, an IPTV broadcast program delivered from the IPTV broadcast station 141 is multicast-delivered via the P-GW 123→the S-GW 122 to the off-load GW 124 on one communication path. The IPTV broadcast program is delivered through individual (unicast) packets of the number of mobile terminals 105 from the off-load GW 124 via the base station 111 to the mobile terminals 105.

For example, as depicted in FIG. 1, it is assumed that the two mobile terminals 105 (users A and B) are connected to the one off-load GW (#2) 124 for viewing an IPTV broadcast program. In this case, the IPTV broadcast program delivered from the IPTV broadcast station 141 is multicast-delivered via the P-GW 123→the S-GW 122 to the off-load GW 124 by using one communication path. Two communication paths are used only from the off-load GW (#2) 124 to the two mobile terminals 105 for delivery through individual (unicast) packets. As described above, according to the embodiment, it is not necessary to dispose communication paths corresponding to the number of the mobile terminals 105 in the EPC network 102 and the traffic can be reduced in the multicast network (including a path of transmission as a multicast packet from the IPTV broadcast station 141, e.g., the EPC network 102).

Figure 2:
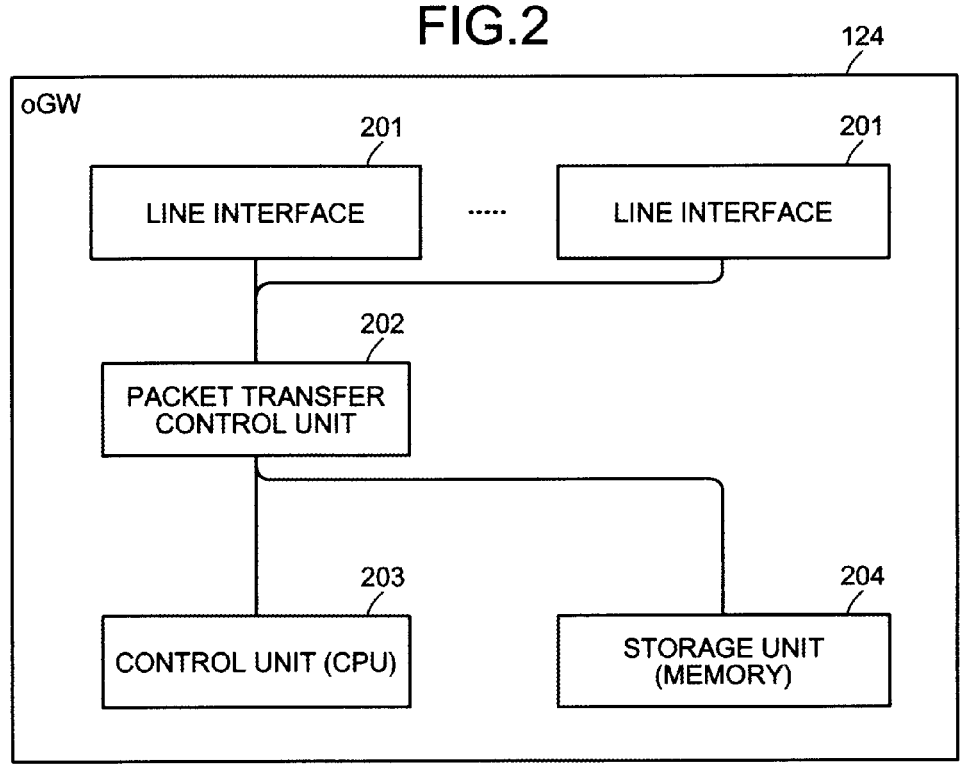
FIG. 2 is a diagram of a hardware configuration example of an off-load GW.

FIG. 2 is a diagram of a hardware configuration example of the off-load GW. In FIG. 2, the off-load GW 124 includes line interfaces 201, a packet transfer control unit (packet transfer control circuit, packet transfer controller) 202 connected to the line interfaces 201, a control unit 203 made up of a central processing unit (CPU) etc., connected to the packet transfer control unit 202, and a storage unit 204 such as a memory.

The line interfaces 201 accommodate a line connecting the off-load GW 124 and the base station 111, a line connecting the off-load GW 124 and the S-GW 122, a line connecting the off-load GW 124 and the MME 121, and a line connecting the off-load GW 124 and the multicast network. The off-load GW 124 is disposed with the one or more line interfaces 201 corresponding to the number of lines accommodated by the off-load GW 124. The line interfaces 201 are formed from a general-purpose or dedicated semiconductor circuit (such as an LSI and an ASIC).

The packet transfer control unit 202 executes a packet transfer process. Therefore, the packet transfer control unit 202 has a routing table, finds an output port corresponding to a destination address of a packet from the routing table, and sends the packet to the output port. The packet transfer control unit 202 can be formed as a circuit chip equipped with a general-purpose or dedicated semiconductor circuit (such as an LSI, an ASIC, a programmable logic device (PLD), and a digital signal processor (DSP)).

The control unit (CPU) 203 controls the overall operation of the off-load GW 124 through the control of the packet transfer control unit 202. The CPU 203 is an example of a controller (control unit) and an example of a processor. A controller responsible for the function of the CPU 203 can be implemented by application of a dedicated or general-purpose hardware chip. The storage unit 204 is formed from a semiconductor memory such as a read only memory (ROM), a random access memory (RAM), and an electrically erasable programmable read only memory (EEPROM). The storage unit 204 provides a work area for the CPU 203 and a storage area for various programs executed by the CPU 203 and data used in execution of the programs.

FIG. 3 is a functional block diagram of the off-load GW. FIG. 3 depicts functions of the off-load GW 124 implemented by the CPU 203 depicted in FIG. 2 and executing the programs stored in the storage unit 204. As depicted in FIG. 3, when the CPU 203 executes the programs, the CPU 203 acts as a distribution point (relay point) 301.

The function as the distribution point (relay point) 301 includes an S1AP intercept processing unit 311, an X2AP intercept processing unit 312, a merge processing unit 313, a distribution processing unit 314, and a transfer processing unit 315. The storage unit 204 stores a bearer state management table 321 and an off-load condition application state management table 322. The bearer state management table 321 and the off-load condition application state management table 322 are used by the distribution point 301.

In the off-load GW 124 relaying the multicast communication of the mobile terminal 105, the distribution processing unit 314 detects a multicast viewing request (ICMP-join) transmitted through a bearer line by the mobile terminal 105. The distribution processing unit 314 stores the viewing information into the storage unit 204. The distribution processing unit 314 releases the encapsulation of the viewing request and makes a viewing request from the off-load GW 124 to the corresponding IPTV broadcast station 141.

The merge processing unit 313 encapsulates an IPTV broadcast packet from the IPTV broadcast station 141 and sends the packet to the mobile terminal 105 through a bearer line corresponding to the mobile terminal 105 making the viewing request.

When the mobile terminal 105 moves, the off-load GW 124 detects a handover sequence. The transfer processing unit 315 delivers the viewing information from the off-load GW (#1) 124 allowing passage of the handover-source communication of the mobile terminal 105 to the off-load GW (#2) 124 allowing passage of the handover-destination communication. As a result, the transfer processing unit 315 in the off-load GW (#2) 124 allowing passage of the handover-destination communication additionally makes a multicast viewing request of the mobile terminal 105. The off-load GW (#1) 124 allowing passage of the handover-source communication makes an exit from viewing (ICMP-leave) of the mobile terminal 105.

The handover includes X2-based handover executed within a management range of the same MME 121 (between the base stations 111) and S1-based handover executed between the different MMEs 121. If the off-load GW 124 is disposed for each of the base stations 111, the off-load GW 124 is changed in both the X2-based handover and the S1-based handover.

(General Processes of Functions of Off-Load GW)

(1) S1AP Intercept Processing Unit 311

The S1AP intercept processing unit 311 intercepts S1AP: Initial Context Setup Request and executes the following process of:
1. storing the bearer allocation information into the bearer state management table 321 based on S1AP: Initial Context Setup Request;
2. instructing the distribution processing unit 314 to start monitoring an off-load object; and
3. instructing the merge processing unit 313 to start merging for a bearer of the off-load object.

(2) Distribution Processing Unit 314

The distribution processing unit 314 detects TEID+IGMP join of the off-load object and executes the following process of:
1. releasing a capsule of GTP-u and relaying IGMP join to the multicast network;
2. storing a bearer+multicast address into the off-load condition application state management table 322; and
3. instructing an IPTV broadcast viewing participation point to start relaying the bearer of the off-load object.

(3) Merge Processing Unit 313

The merge processing unit 313 receives and checks a multicast packet against the multicast address of the off-load condition application state management table 322 and transmits the multicast packet to an eNB (S1-u TEID (for eNB)) corresponding to a matching bearer.

(Handover Operation of Off-Load Traffic)

The handover includes the X2-based handover and the S1-based handover and the general processes of the functional units will be described for each of the handovers.

(1) General Processes During X2-Based Handover (1-1) The X2AP intercept processing unit 312 of the target oGW intercepts X2AP: Handover Request and executes the following process of:
1. storing the bearer allocation information into the bearer state management table 321 based on X2AP: Handover Request;
2. instructing the distribution processing unit 314 to start monitoring an off-load object; and
3. receiving an off-load condition application state corresponding to UE from oGW corresponding to MME by using MME UE S1AP ID of X2AP: Handover Request as a key.

(1-2) The S1AP intercept processing unit 311 of the target oGW intercepts S1AP: Path Switch Request and executes the following process of:
1. storing the bearer allocation information into the bearer state management table 321 based on S1AP: Path Switch Request;
2. instructing the merge processing unit 313 to start merging for a bearer of the off-load object; and
3. transmitting IGMP join to the multicast network for the multicast information corresponding to the bearer of the off-load condition application state taken over from the source oGW.

(2) General Processes During S1-Based Handover (1-1) The S1AP intercept processing unit 311 of the source oGW intercepts S1AP: Handover Required and executes the following process of:
1. writing information of the off-load condition application state corresponding to UE into the target-eNB-related off-load condition application state management table 322 of the target oGW accommodating the target eNB by using Target ID (eNB-ID) of S1AP: Handover Required; and
2. writing Target CellID inf included in S1AP: Handover Required as S-Target CellID inf. into the target-eNB-related off-load condition application state management table 322 of the target oGW.

(2-2) The S1AP intercept processing unit 311 of the target oGW intercepts S1AP: Handover Request and executes the following process of:
1. storing the bearer allocation information into the bearer state management table 321 based on S1AP: Handover Request;
2. writing Target CellID inf. included in S1AP: Handover Request as T-Target CellID inf. into the bearer state management table 321; and
3. instructing the distribution processing unit 314 to start monitoring the off-load object.

(2-3) The S1AP intercept processing unit 311 of the target oGW intercepts S1AP: Handover Request Ack. and executes the following process of:
1. storing the bearer allocation information into the bearer state management table 321 based on S1AP: Handover Request Ack.;
2. writing C-RTNI inf. included in S1AP: Handover Request Ack. as T-C-RTNI inf. into the bearer state management table 321; and
3. instructing the merge processing unit 313 to start merging for the bearer of the off-load object.

(2-4) The S1AP intercept processing unit 311 of the source oGW intercepts S1AP: Handover Command. and executes the following process of:
1. writing C-RTNI inf. included in S1AP: Handover Command. as S-C-RTNI inf. into the target-eNB-related off-load condition application state management table 322 of the target oGW;
2. supplying Target ID+CellID inf.+S-C-RTNI inf. to a distribution point of the target oGW, determining UE having corresponding eNBID+CellID inf.+T-C-RTNI inf. of the bearer state management table 321, and copying the information of the target-eNB-related off-load condition application state management table 322 as an off-load condition application state of the UE; and
3. transmitting IGMP join to the multicast network based on each piece of the multicast viewing information corresponding to the bearer of the off-load condition application state.

FIG. 4 is a diagram for explaining X2-based handover operation of off-load traffic by the off-load GW. The functions implemented by the CPU 203 are depicted. FIG. 4 depicts the off-load GW 124(#1) acting as a source GW and the off-load GW 124(#2) acting as a target oGW.

The S1AP intercept processing unit 311 intercepts a control packet based on S1 Application Protocol (S1AP) transmitted/received between the base station 111 and the MME 121. S1AP is a C-plane protocol providing signaling service between the base station 111 (eUTRAN) and the MME 121 (EPC). The functions of S1AP include the establishment, change, and release of a bearer, the handover control, and the control of incoming call to a standby mobile terminal, for example.

The X2AP intercept processing unit 312 intercepts a control packet based on X2 Application Protocol (X2AP) transmitted/received between the base stations 111. X2AP is a C-plane protocol between the base stations (eNodeB) 111 on the X2 interface and assists the load management and the handover adjustment between base stations 111.

The distribution processing unit 314 branches IPTV viewing information (IGMP-join/leave/report) out of traffic flowing through an uplink GPRS Tunneling Protocol for User Plane (GTP-u) tunnel to the multicast network. GTP-u is an IP transmission protocol between the base station 111 and the S-GW 122. The traffic flows through a bearer (GTP-u tunnel) established between the base station 111 and the S-GW 122 based on GTP-u. Tunnel Endpoint Identifier (TEID) is an identifier of a terminal point of a GTP-u tunnel set in a GTO header of a packet.

The merge processing unit 313 merges the off-load traffic (multicast PDU of IPTV broadcasting) from the multicast network with traffic from the S-GW 122 flowing through a down link GTP-u tunnel. The packet transfer control unit 202 executes a NAPT process (IP address conversion and TCP/UDP port conversion related to off-load object traffic) between the EPC network 102 and the multicast network.

In this embodiment, the off-load GW 124 at the start of the off-load object IPTV broadcast between the mobile terminal 105 and the communication counterpart (IPTV broadcast station 141) is set as an IPTV broadcast viewing participation point. For example, as depicted in FIG. 4, when the mobile terminal 105 connected to the base station (#1) 111 receives a multicast packet from the IPTV broadcast station 141, the off-load GW (#1) 124 executing the off-load process is set as the IPTV broadcast viewing participation point.

The distribution point is changed by handover associated with movement of the mobile terminal 105. In particular, if the handover-destination base station 111 (target base station) of the mobile terminal 105 is accommodated by the off-load GW 124 different from the handover-source base station 111 (source base station), the IPTV broadcast viewing participation point is changed.

In this embodiment, the original off-load GW (#1) 124 transfers the multicast viewing information of the traffic off-load object to the target off-load GW (#2) 124 that is a new IPTV broadcast viewing participation point. For example, in FIG. 4, the transfer processing unit 315 of the original off-load GW (#1) 124 transfers the off-load condition application state management table 322 for copying to the off-load condition application state management table 322 of the target off-load GW (#2) 124.

The target off-load GW (#2) 124 retains the transferred off-load condition application state management table 322 and makes a request for participation in multicast viewing (IGMP-join) via the multicast network to the IPTV broadcast station 141. The transfer processing unit 315 of the target off-load GW (#2) 124 makes the request for participation in multicast viewing on behalf of the moved mobile terminal 105. The transfer processing unit 315 transfers a multicast packet from the IPTV broadcast station 141 via the base station (#2) 111 to the mobile terminal 105. As a result, even if the mobile terminal 105 moves, the multicast packets of the IPTV broadcasting can continuously be delivered to the mobile terminal 105. If the maintained multicast communication is terminated, an exit from multicast viewing is made.

As a result, instead of sending the multicast viewing information from each of the multiple mobile terminals 105 for each movement, the source and target off-load GWs 124 transfer the multicast viewing information to/from each other via the multicast network. Therefore, even if the mobile terminal 105 moves, the multicast packets of IPTV broadcasting etc., are not interrupted.

The off-load GW 124 controls the sending-out of the multicast viewing information and delivers to the multiple mobile terminals 105, a multicast packet of the same IPTV broadcasting delivered from the IPTV broadcast station 141. As a result, increases in traffic in the EPC network 102 can be suppressed without disposing a communication line of the EPC network 102 for each of the mobile terminals 105.

FIG. 5 is a diagram for explaining S1-based handover operation of off-load traffic by an off-load GW. In the S1-based handover, the storage unit 204 of the target off-load GW (#2) 124 is additionally disposed with target-eNB-related off-load condition application state data 501 for each of the target base stations 111 (target eNB) in addition to the configuration for the X2-based handover (FIG. 4).

The transfer processing unit 315 of the original off-load GW (#1) 124 transfers the off-load condition application state management table 322 for copying to the target-eNB-related off-load condition application state data 501 of the target off-load GW (#2) 124 (copy 1 of FIG. 5).

The target off-load GW (#2) 124 copies the off-load condition application state management table 322 of the target-eNB-related off-load condition application state data 501 to the off-load condition application state management table 322 (copy 2 of FIG. 5). The transfer processing unit 315 of the target off-load GW (#2) 124 makes a request for participation in multicast viewing (IGMP-join) via the multicast network to the IPTV broadcast station 141. The other processes are the same as in FIG. 4.

Further details of the off-load GW 124 will hereinafter be described. FIG. 6 is a sequence diagram of an example of activation and off-load processes of a mobile terminal. FIG. 7A is a sequence diagram of a process example of the S1-based handover and FIG. 7B is a sequence diagram of a process example of the X2-based handover. Details of the sequences will be described later.

FIG. 8 is a chart of a data structure example of off-load condition application state data. The off-load condition application state management table 322 stores one or more records including an off-load-GW UE identifier, a user line identifier (E RAB ID), and multicast viewing information.

The "oGW UE identifier" is information for the off-load GW (oGW) 124 uniquely identifying the mobile terminal (UE) 105. The "user line identifier" is information uniquely identifying a line in the mobile terminal 105 and is synchronized with a line identifier (E RAB ID) in the mobile terminal 105. The "multicast viewing information" is a multicast address corresponding to the mobile terminal 105.

FIG. 9 is a chart of a data structure example of an uplink GTP-u packet (UL encapsulated packet) from the base station to the S-GW. IGMP-join data 901 and IGMP-leave data 902 are exemplarily depicted. The GTP-u packet is a multicast packet having an IGMP header and an IP header encapsulated by a GTP-u header, a User Datagram Protocol (UDP-G) header, and an IP_G header. A layer-2 (L2) header and a layer-1 (L1) header are added to the encapsulated packet.

In the IGMP header, type information related to participation in or exit from multicast viewing and a multicast group address are set. A destination IP address in the IP header is set to the IP address of the server of the target IPTV broadcast station 141, and a source IP address is set to the UP address of the mobile terminal 105. On the other hand, a destination IP address in the IP_G header is set to the IP address of the target S-GW 122, and a source address is set to the IP address of the base station 111. TEID is set to a value indicative of the S-GW 122 located at the terminal point of the GTP tunnel.

FIG. 10 is a chart of a data structure example of a downlink GTP-u packet (DL encapsulated packet) from the S-GW to the base station. The source IP address and the destination IP address in the IP header and the IP_G header are reversed as compared to the GTP-u packet depicted in FIG. 9. UDP is IPTV broadcast contents delivered from the IPTV broadcast station 141. TEID indicates the tunnel terminal point in the target base station 111. This data structure example is also a data structure example of a packet of GTP-u when a packet via the multicast network is transmitted from the distribution point 301 to the base station 111.

FIG. 11 is a chart of a configuration example of a packet (UL off-load packet) utilized when an off-load object uplink packet is transmitted from the off-load GW of the IPTV broadcast viewing participation point to the multicast network (IPTV broadcast station). Examples of IGMP-join data 1101 and IGMP-leave data 1102 are depicted. FIG. 12 is a chart of a configuration example of a packet (DL off-load packet) arriving at the off-load GW of the IPTV broadcast viewing participation point via the multicast network from the IPTV broadcast station.

Figure 13:
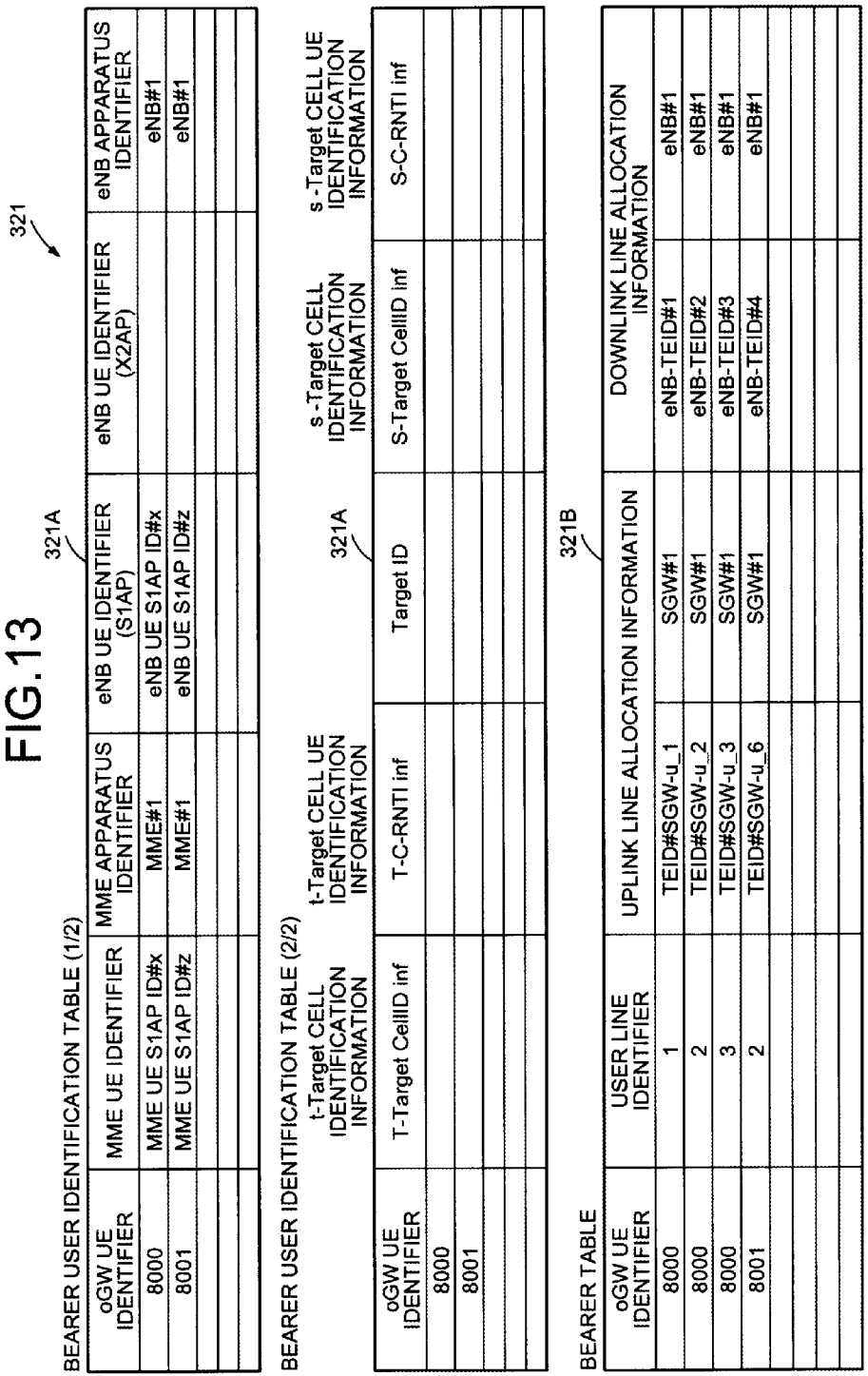
FIG. 13 is a chart of a bearer state management table.

FIG. 13 is a chart of a bearer state management table. In this embodiment, the bearer state management table 321 is managed, including a bearer user identification table 321A and a bearer table 321B. However, an example of table configuration is depicted.

The bearer user identification table 321A is formed as a series of tables. An "off-load-GW (oGW) UE identifier" in the bearer user identification table 321A has the same value as the off-load-GW UE identifier of the bearer table 321B and is described for explicitly indicating that the records are the same.

The "off-load-GW (oGW) UE identifier" stores information uniquely identifying the mobile terminal 105 in the corresponding off-load GW 124. The off-load-GW UE identifier is stored as an off-load-GW UE identifier having the same value for the same portable terminal 105 in both the off-load condition application state management table 322 and the bearer user identification table 321A.

An "MME UE identifier" is an identifier (MME UE S1AP ID) of the mobile terminal 105 added by the MME 121. An "MME apparatus identifier" is an identifier of the MME 121 (MME apparatus) adding the MME UE identifier to the mobile terminal 105. An "eNB UE identifier (S1AP)" is an identifier (eNB UE S1AP ID) of the mobile terminal 105 added by the base station 111 (eNB).

An "eNB UE identifier (X2AP)" is an identifier (eNB UE X2AP ID) of the mobile terminal 105 added by the base station 111. An "eNB apparatus identifier" is an identifier of the base station 111 adding the eNB UE identifier (S1AP) and the eNB UE identifier (X2AP) to the mobile terminal 105.

"T-Target cell identification information" is handover-destination cell identification information selected by the handover-source base station 111 and received by the target off-load GW (#2) 124 at the handover destination. "T-Target-cell UE identification information" is identification information of the mobile terminal 105 in the handover-destination cell selected by the handover-destination base station 111 and received by the handover-destination off-load GW 124. A "Target ID" is an identifier of the handover-destination base station 111 selected by the handover-source base station 111 and received by the handover-source off-load GW 124.

"S-Target cell identification information" is handover-destination cell identification information selected by the handover-source base station 111 and received by the source off-load GW 124 at the handover source. "S-Target-cell UE identification information" is identification information of the mobile terminal 105 in the handover-destination cell selected by the handover-destination base station 111 and received by the handover-destination off-load GW 124.

The bearer table 321B depicted in FIG. 13 has the following data. An "off-load GW (oGW) UE identifier" is information uniquely identifying the mobile terminal 105 in the off-load GW 124. The bearer table 321B stores the same value as the "off-load GW UE identifier" of the bearer user identification table 321A for the same mobile terminal 105. A "user line identifier" is information uniquely identifying a line in the mobile terminal 105 and is synchronized with the line identifier (E RAB ID) in the mobile terminal 105.

"Uplink line allocation information" is destination information of an uplink packet to the S-GW 122 for the user line identifier. "Downlink line allocation information" is destination information of a downlink packet to the base station 111 for the user line identifier.

Data structure examples of main messages exchanged between nodes will be described. FIG. 14 is a chart of a configuration example of an Initial Context Setup Request message transmitted from an MME to a base station at the time of activation of a mobile terminal. FIG. 15 is a chart of a configuration example of an Initial Context Setup Response message that is a response message to the Initial Context Setup Request message. The Initial Context Setup Response message is transmitted from the base station 111 to the MME 121.

FIG. 16 is a chart of a configuration example of a Handover Required message transmitted from a mobile terminal to a source MME at the time of the S1-based handover of the mobile terminal. FIG. 17 is a chart of a configuration example of a Handover Request message transmitted from a target MME to a target base station at the time of the S1-based handover. FIG. 18 is a chart of a configuration example of a Handover Request Ack. message returned from the target base station to the target MME in response to the Handover Request message.

FIG. 19 is a chart of a configuration example of a Handover Command message transmitted from the source MME to a source base station (serving base station). FIG. 20 is a chart of a configuration example of a UE Context Release Command message transmitted from the source MME 121 to the source base station 111.

FIG. 21 is a chart of a configuration example of an X2AP: Handover Request message transferred from the source base station via a target off-load GW to the target base station in the X2-based handover. FIG. 22 is a chart of a configuration example of an X2AP: Handover Request Ack. message that is a response message to the X2AP: Handover Request message. The X2AP: Handover Request Ack. message is transmitted via the target off-load GW (#2) 124 from the target base station (#2) 111 to the source base station (#1) 111. FIG. 23 is a chart of a configuration example of an X2AP: UE context Release message.

FIG. 24 is a chart of a configuration example of a Path Switch Request message transferred from the target base station to the MME in the X2-based handover. FIG. 25 is a chart of a Path Switch Request Ack. message transmitted from the MME to the target base station as a response to the Path Switch Request message.

A process flow example in the off-load GW 124 will be described. The following processes are executed by the control unit (CPU) 203. FIG. 26 is a flowchart of process details when the off-load GW of the distribution point receives an uplink GTP-u packet from the base station to the S-GW.

In FIG. 26, first, the CPU 203 obtains a record of the bearer table 321B having the uplink line allocation information of the bearer table 321B identical to the TEID of the received packet and identifies the oGW UE identifier and the user line identifier (S2601).

The CPU 203 determines whether the record exists (S2602). If the record does not exist (step S2602: NO), the CPU 203 goes to S2611 to relay the received packet (GTP-u) to the S-GW 122 (step S2611) and terminates the process. On the other hand, if the record exists (step S2602: YES), the CPU 203 goes to S2603.

At S2603, if the record exists, the CPU 203 obtains from the off-load condition application state management table 322, a record corresponding to the oGW UE identifier and the user line identifier and having the multicast viewing information identical to the group address information of the received packet (step S2603).

The CPU 203 determines whether the record exists (S2604). If the record exists (step S2604: YES), the CPU 203 goes to S2605 and if the record does not exist (step S2604: NO), the CPU 203 goes to S2608.

At S2605, the CPU 203 determines whether the GTP-u user data indicates an exit from multicast viewing (IGMP-leave). In the case of the exit request (step S2605: YES), the CPU 203 goes to S2606 and in a case other than the exit request (participation in multicast viewing (IGMP-join)) (step S2605: NO), the CPU 203 goes to S2607.

At S2606, the CPU 203 deletes from the off-load condition application state management table 322, the record corresponding to the oGW UE identifier and the user line identifier and having the multicast viewing information identical to the group address of the received packet (step S2606).

At S2607, the CPU 203 obtains the GTP-u user data from the received packet (GTP-u) to form an IGMP packet, and writes SA information of the IGMP packet as the IP address of the multicast network of the off-load GW 124 to transmit the IGMP packet to the destination (step S2607). The process is then terminated.

At S2608, the CPU 203 determines whether the GTP-u user data is a multicast viewing request (IGMP-join). In the case of the viewing request (IGMP-join) (step S2608: YES), the CPU 203 goes to S2609. In a case other than the viewing request (exit form multicast viewing (IGMP-leave)) (step S2608: NO), the CPU 203 goes to S2611 to relay the received packet (GTP-u) to the S-GW 122 (step S2611) and terminates the process.

At S2609, the CPU 203 adds a record by using the group address of the received packet as the multicast viewing information of the off-load condition application state management table 322 corresponding to the oGW UE identifier and the user line identifier (step S2609).

At S2610, the CPU 203 obtains the GTP-u user data from the received packet (GTP-u) to form an IGMP packet, and writes SA information of the IGMP packet as the IP address of the multicast network of the off-load GW 124 to transmit the IGMP packet to the destination (step S2610). The process is then terminated.

FIG. 27 is a flowchart of process details when the off-load GW of the IPTV broadcast viewing participation point receives a multicast packet of IPTV broadcasting from the multicast network. The following processes are executed by the control unit (CPU) 203.

First, the CPU 203 obtains the DA information of the received packet (UDP/IP) for multicast delivery on the side of the off-load GW 124 (step S2701).

The CPU 203 searches for and retrieves a record having the multicast viewing information identical to oGW-side multicast delivery information in records of the off-load condition application state management table 322 (step S2702).

The CPU 203 determines whether the record exists (step S2703). If the record does not exist (step S2703: NO), the process is then terminated. On the other hand, if the record exists (step S2703: YES), the process goes to step S2704.

At S2704, the CPU 203 performs GTP-u encapsulation of a received UDP/IP packet to generate a GTP-u packet (generate an encapsulated packet) (step S2704).

The CPU 203 repeatedly searches for a record having the multicast viewing information identical to the oGW-side multicast delivery information in records of the off-load condition application state management table 322 (step S2705). The CPU 203 determines TEID and the destination base station (eNB) 111 of the GTP-u packet according to downlink line allocation information of a record of the bearer table 321B corresponding to the picked-up record and transmits the GTP-u packet (step S2706). Subsequently, if a matching record no longer exists at step S2705, the process is then terminated.

FIG. 28 is a flowchart of process details when the Initial Context Setup Request message (MME→eNB) is intercepted. This process is executed by the S1AP intercept processing unit 311 of the CPU 203.

First, the S1AP intercept processing unit 311 acquires an oGW UE identifier (step S2801). The S1AP intercept processing unit 311 correlates "MME UE S1AP ID" and "eNB UE S1AP ID" in the Initial Context Setup Request message with the oGW UE identifier and respectively registers in the bearer user identification table 321A, "MME UE S1AP ID" and "eNB UE S1AP ID" as an MME UE identifier and an eNB UE identifier (S1AP) (step S2802).

The S1AP intercept processing unit 311 correlates the uplink line allocation information in the Initial Context Setup Request message with the oGW UE identifier and registers the uplink line allocation information as the uplink line allocation information in the bearer table 321B for each user line identifier (E RAB ID) (step S2803). The process is then terminated.

FIG. 29 is a flowchart of process details when the Initial Context Setup Response message (eNB→MME) is intercepted. This process is executed by the S1AP intercept processing unit 311 of the CPU 203. First, the S1AP intercept processing unit 311 uses "MME UE S1AP ID" in the Initial Context Setup Request message to search for an MME UE identifier of the bearer user identification table 321A and determines a corresponding record (step S2901).

The S1AP intercept processing unit 311 sets the downlink line allocation information in the Initial Context Setup response message as the downlink line allocation information in the bearer table 321B for each user line identifier (E RAB ID) (step S2902). The process is then terminated.

FIG. 30 is a flowchart of process details when the Handover Required message (source eNB→source MME) is intercepted at the time of the S1-based handover. This process is executed by the S1AP intercept processing unit 311 of the CPU 203.

First, the S1AP intercept processing unit 311 uses "MME UE S1AP ID" in the Handover Required message to search for an MME UE identifier of the bearer user identification table 321A and determines a corresponding record (step S3001).

The S1AP intercept processing unit 311 sets "Target ID" and cell identification information in "Source to Target Transparent Container" in the Handover Required message t as "Target ID" and "s-Target cell identification information" of a corresponding record in the bearer user identification table 321A (step S3002). The process is then terminated.

FIG. 31 is a flowchart of process details when the Handover Request message (target MME→target eNB) is intercepted at the time of the S1-based handover. This process is executed by the S1AP intercept processing unit 311 of the CPU 203.

First, the S1AP intercept processing unit 311 acquires an oGW UE identifier (step S3101). The S1AP intercept processing unit 311 correlates "MME UE S1AP ID" and "Cell ID" information in "Source to Target Transparent Container" in the Handover Request message with the oGW UE identifier and registers "MME UE S1AP ID" and the "Cell ID" information as an MME UE identifier and t-Target cell position information of the bearer user identification table 321A (step S3102).

The S1AP intercept processing unit 311 correlates the uplink line allocation information in the Handover Request message with the oGW UE identifier and registers both into the bearer table 321B for each user line identifier (E RAB ID) (step S3103). The process is then terminated.

FIG. 32 is a flowchart of process details when the Handover Request Ack. message (target eNB→target MME) is intercepted at the time of the S1-based handover. This process is executed by the S1AP intercept processing unit 311 of the CPU 203.

First, the S1AP intercept processing unit 311 uses "MME UE S1AP ID" in the Handover Request Ack. message to search for an MME UE identifier of the bearer user identification table 321A and determines a corresponding record (step S3201).

Subsequently, the S1AP intercept processing unit 311 stores to the determined record as an eNB UE identifier and t-Target cell UE identification information in the bearer user identification table 321A, "eNB UE S1AP ID" and cell UE identification information in "Target to Source Transparent Container" in the Handover Request Ack. message (step S3202).

The S1AP intercept processing unit 311 sets the downlink line allocation information in the Handover Request Ack. message as the downlink line allocation information of the bearer table 321B for each user line identifier (step S3203). The process is then terminated.

FIG. 33 is a flowchart of process details when the Handover Command message (source MME→source eNB) is intercepted at the time of the S1-based handover. This process is executed by the S1AP intercept processing unit 311 of the CPU 203.

First, the S1AP intercept processing unit 311 uses "MME UE S1AP ID" in the Handover Command message to search for an MME UE identifier of the bearer user identification table 321A to determine a corresponding record and determines an oGW UE identifier (step S3301).

The S1AP intercept processing unit 311 sets Cell UE identification information in "Target to Source Transparent Container" in the Handover Command message as s-Target cell UE identification information in the bearer user identification table 321A (step S3302).

The S1AP intercept processing unit 311 identifies the target off-load GW 124 accommodating the base station (eNB) 111 indicated by Target ID of the determined record (step S3303).

The S1AP intercept processing unit 311 determines a record that has the "eNB apparatus identifier", the "t-Target cell identification information", and the "t-Target cell UE identification information" of the bearer user identification table 321A in the target off-load GW 124 identical to the "Target ID", the "s-Target cell identification information", and the "s-Target cell UE identification information" of the bearer user identification table 321A. The CPU 203 determines a target oGW UE identifier (step S3304).

The S1AP intercept processing unit 311 defines the "user line identifier" and the "multicast viewing information" in the off-load condition application state management table 322 corresponding to the oGW UE identifier as the "user line identifier" and the "multicast viewing information" corresponding to the oGW UE identifier of the target off-load GW 124 to add a record to the off-load condition application state management table 322 (step S3305).

Based on the added multicast viewing information, the S1AP intercept processing unit 311 edits and transmits to the multicast network, participation in multicast viewing (IGMP-join) (step S3306). The process is then terminated.

FIG. 34 is a flowchart of process details when the UE Context Release Command message (source MME→source eNB) is intercepted at the time of the S1-based handover. This process is executed by the S1AP intercept processing unit 311 of the CPU 203.

First, the S1AP intercept processing unit 311 uses "MME UE S1AP ID" in the UE Context Release Command message to search for an MME UE identifier of the bearer user identification table 321A to determine a corresponding record and determine an oGW UE identifier (step S3401).

The S1AP intercept processing unit 311 deletes a record of the off-load condition application state management table 322 corresponding to the oGW UE identifier (step S3402).

Based on the multicast viewing information of the deleted record, the S1AP intercept processing unit 311 edits and transmits to the multicast network, an exit from multicast viewing (IGMP-leave) (step S3403).

The S1AP intercept processing unit 311 deletes records of the bearer user identification table 321A and the bearer table 321B corresponding to the oGW UE identifier (step S3404). The process is then terminated.

FIG. 35 is a flowchart of process details when the X2AP: Handover Request message (source eNB→target eNB) is intercepted at the time of the X2-based handover. This process is executed by the X2AP intercept processing unit 312 of the CPU 203.

First, the X2AP intercept processing unit 312 determines whether the source base station (eNB) 111 of the Handover Request is the base station 111 accommodated by its own oGW (step S3501). If the base station 111 is accommodated by its own oGW (step S3501: YES), the process goes to S3509. On the other hand, if the base station 111 is accommodated by another oGW (step S3501: NO), the process goes to S3502.

At S3502, the X2AP intercept processing unit 312 acquires an oGW UE identifier (step S3502). The X2AP intercept processing unit 312 correlates "MME UE S1AP ID" in the Handover Request with the oGW UE identifier. The CPU 203 registers the "MME UE S1AP ID" as an MME UE identifier of the bearer user identification table 321A (S3503).

The X2AP intercept processing unit 312 correlates the uplink line allocation information in the Handover Request with the oGW UE identifier. The CPU 203 registers the information as the uplink line allocation information of the bearer table 321B for each user line identifier (E RAB ID) (step S3504).

The X2AP intercept processing unit 312 identifies the source off-load GW 124 accommodating the source base station 111 (step S3505).

The X2AP intercept processing unit 312 determines a record that has the MME UE identifier of the bearer user identification table 321A identical to the MME UE identifier of the bearer user identification table 321A of the source off-load GW 124. As a result, the source off-load GW UE identifier is determined (step S3506).

The X2AP intercept processing unit 312 defines the user line identifier and the multicast viewing information in the off-load condition application state management table 322 corresponding to the oGW UE identifier of the source off-load GW 124 as the user line identifier and the multicast viewing information of the off-load condition application state management table 322 corresponding to the oGW UE identifier of the target off-load GW 124 to add a record (step S3507).

Based on the added multicast viewing information, the X2AP intercept processing unit 312 edits and transmits to the multicast network, participation in multicast viewing (IGMP-join) (step S3508). The process is then terminated.

At step S3509, the X2AP intercept processing unit 312 uses "MME UE S1AP ID" in the Handover Request to search for an MME UE identifier of the bearer user identification table 321A to determine a record (S3509).

At step S3510, the X2AP intercept processing unit 312 records in an eNB UE identifier (X2AP) of the bearer user identification table 321A, Old eNB UE X2AP ID information in the Handover Request (step S3510). The process is then terminated.

FIG. 36 is a flowchart of process details when the X2AP: UE Context Release message (target eNB→source eNB) is intercepted at the time of the X2-based handover. This process is executed by the X2AP intercept processing unit 312 of the CPU 203.

First, the X2AP intercept processing unit 312 determines whether the source base station (eNB) 111 of the UE Context Release is the base station accommodated by the corresponding off-load GW 124 (step S3601). If the base station is accommodated by the corresponding off-load GW 124 (step S3601: YES), the process is terminated.

On the other hand, if the base station 111 is an base station accommodated by another off-load GW 124 (step S3601: NO), the X2AP intercept processing unit 312 uses "Old eNB UE X2AP ID" in the UE Context Release message to search for an eNB UE identifier (X2AP) of the bearer user identification table 321A to determine a corresponding record and determines an oGW UE identifier (step S3602).

The X2AP intercept processing unit 312 deletes a record of the off-load condition application state management table 322 corresponding to the oGW UE identifier (step S3603). The X2AP intercept processing unit 312 deletes records of the bearer user identification table 321A and the bearer table 321B corresponding to the oGW UE identifier (step S3604).

Based on the multicast viewing information of the deleted records, the X2AP intercept processing unit 312 edits and transmits to the multicast network, participation in multicast viewing (IGMP-join) (step S3605). The process is then terminated.

FIG. 37 is a flowchart of process details when the Path Switch Request message (target eNB→MME) is intercepted at the time of the X2-based handover. This process is executed by the X2AP intercept processing unit 312 of the CPU 203.

First, the X2AP intercept processing unit 312 uses MME UE S1AP ID in the Path Switch Request message to search for an MME UE identifier of the bearer user identification table 321A to determine a corresponding record (step S3701).

The X2AP intercept processing unit 312 sets the downlink line allocation information in the Path Switch Request message as the downlink line allocation information of the bearer table 321B for each user line identifier (E RAB ID) (step S3702). The process is then terminated.

FIG. 38 is a flowchart of process details when the Path Switch Request Ack. message (MME→target eNB) is intercepted at the time of the X2-based handover. This process is executed by the X2AP intercept processing unit 312 of the CPU 203.

First, the X2AP intercept processing unit 312 uses MME UE S1AP ID in the Path Switch Request Ack. message to search for an MME UE identifier of the bearer user identification table 321A to determine a corresponding record (step S3801).

the X2AP intercept processing unit 312 sets the uplink line allocation information in the Path Switch Request Ack. message as the uplink line allocation information of the bearer table 321B for each user line identifier (E RAB ID) (step S3802). The process is then terminated.

FIG. 39 is a chart of an oGW accommodation table of accommodation of a base station in an off-load GW. This information is stored in the storage unit 204 of the off-load GW 124. The CPU 203 of the oGW 124 uses this oGW accommodation table to find the oGW 124 accommodating the eNB 111. For example, the oGW accommodation table is used for identifying the oGW 124 acting as a distribution point as a result of handover of the portable terminal 105.

Operation examples of the embodiment will hereinafter be described with reference to the drawings.

Operation Example 1

Start of IPTV Broadcast Viewing

The operation from activation of the mobile terminal 105 until start of IPTV broadcast viewing will be described.

[Operation 1-1]

In the sequence depicted in FIG. 6, when the mobile terminal 105 (UE#x) is activated, an attach procedure is performed. In other words, the mobile terminal 105 transmits an Attach Request message that is a connection request message to the base station 111 (FIG. 6, <1>). The Attach Request message is transmitted via the base station 111 (eNB#1) to the MME 121 (MME#1).

The MME 121 sends a Create Session Request message to the S-GW (SGW) 122 (S-GW#1) (FIG. 6, <2>). The MME 121 receives a Create Session Response message from the S-GW 122 (FIG. 6, <3>).

[Operation 1-2]

The MME 121 receiving the Create Session Response message from the S-GW 122 generates and sends an Initial Context Setup Request message (FIG. 14) to the base station 111 (FIG. 6, <4>). The off-load GW (oGW) 124 intercepts the Initial Context Setup Request message (FIG. 6, <5>).

The off-load GW executes the process depicted in FIG. 28. The process depicted in FIG. 28 results in registration and determination of the oGW UE identifier (8000), the MME UE identifier (MME#1 UE S1AP ID#x), the MME apparatus identifier (MME#1), the eNB UE identifier (eNB UE S1AP ID#x), the eNB apparatus identifier (eNB#1), the user line identifier (1, 2), and the uplink line allocation information (1: TEID#SGW-u1, SGW#1, 2: TEID#SG, SGW#1) in the bearer user identification table 321A and the bearer table 321B. FIG. 40 is a chart of an information registration state in the bearer state management table.

[Operation 1-3]

The base station 111 receiving the Initial Context Setup Request message transmits an initial Context Setup Response message (FIG. 15) that is a response message (FIG. 6, <6>). The off-load GW 124 intercepts the initial Context Setup Response message (FIG. 6, <7>) and executes the process depicted in FIG. 29. As a result, the downlink line allocation information (1: eNB-TEID#1, eNB#1, 2: eNB-TEID#2, eNB#1) is determined and registered in the bearer table 321B (see FIG. 40).

[Operation 1-4]

In the sequence depicted in FIG. 6, when the mobile terminal 105 starts connection with the IPTV broadcast station 141, (FIG. 6, <8>), the GTP-u packet (FIG. 5) is transmitted from the base station 111 (eNB#1) to the S-GW 122 (S-GW#1) (FIG. 6, <9>). The off-load GW 124 (oGW#1) receives the GTP-u packet (IGMP-join) and executes the process depicted in FIG. 26 (FIG. 6, <10>).

[Operation 1-5]

As a result of the operation at S2609 in FIG. 26, the multicast viewing information corresponding to the oGW UE identifier and the user line identifier is stored in the off-load condition application state management table 322. FIG. 41 is a chart of a state when the multicast viewing information is registered in the off-load condition application state management table.

[Operation 1-6]

As a result of the operation at S2610 in FIG. 26, a packet for participation in multicast viewing (IGMP-join) is transmitted to the multicast network to the IPTV broadcast station 141 (FIG. 6, <11>).

[Operation 1-7]

When the packet of the multicast viewing information arrives via the multicast network at the IPTV broadcast station 141, the multicast packet (FIG. 12) arrives from the IPTV broadcast station 141 via the multicast network at the off-load GW 124 (oGW#1) (FIG. 6, <12>). In response to the reception of the multicast packet, the off-load GW 124 executes the process depicted in FIG. 27 and performs multicast transmission of the IPTV broadcast via the base station (eNB#1) 111 to the mobile terminal (UE) 105 (FIG. 6, <12>, <13>).

FIG. 42 is a diagram of a flow of traffic due to off-load condition application after the start of IPTV viewing. As a result of the processes described above, multicast communication is established via the multicast network without the intervention of the S-GW 122 of the EPC network 102 as depicted in FIG. 42.

[Operation 1-8]

Data from the mobile terminal (UE#x) 105 and destined for the IPTV broadcast station 141 is transmitted as follows. The data from the mobile terminal (UE#x) 105 and received by eNB#1 is transmitted through the GTP-u packet (FIG. 9) from the base station 111 (eNB#1) to S-GW#1 (FIG. 6, <9>). The off-load GW (oGW#1) 124 receives the packet of FIG. 9 and executes the process of FIG. 26 to transmit the packet depicted in FIG. 11 via the multicast network to the IPTV broadcast station 141 (FIG. 6, <10>).

[Operation 1-9]

Data from the IPTV broadcast station 141 to the mobile terminal (mobile terminal (UE#x) 105) is transmitted as follows. For the data, the packet depicted in FIG. 12 is transmitted from the IPTV broadcast station 141 to the off-load GW (oGW#1) 124 (FIG. 6, <12>). The off-load GW (oGW#1) 124 receives the packet depicted in FIG. 12 and executes the process depicted in FIG. 27 to transmit the packet of FIG. 10 to the base station (eNB#1) 111 (FIG. 6, <14>). The base station (eNB#1) 111 sends the data to the mobile terminal (UE#x) 105.

Operation Example 2

Maintenance of IPTV Broadcast Viewing in S1-Based Handover

Description will be made of the operation when handover is achieved from the handover-source base station (source eNB) 111 to the handover-destination base station (target eNB) 111 due to movement of the mobile terminal 105 while maintaining the IPTV broadcasting on the mobile terminal (UE#x) with reference to the sequence describing the S1-based handover procedure of FIG. 7A.

[Operation 2-1]

When the source eNB (#1) 111 starts the S1-based handover due to movement of the mobile terminal (UE#x) 105, the Handover Required message (FIG. 16) is transmitted from the source eNB (#1) 111 to the handover-source MME (source MME (#1)) 121 (FIG. 7A, <1>). The handover-source off-load GW (source oGW (#1)) 124 intercepts the Handover Required message (FIG. 7A, <2>) and executes the process depicted in FIG. 30.

[Operation 2-2]

FIG. 43 is a chart of an example of takeover of the off-load condition application state in the S1-based handover between off-load GWs. As a result of the process of FIG. 30, the identifier "Target ID=eNB#2" of the handover-destination base station 111 and the handover-destination cell identification information "s-Target cell identification information=Cell ID#x" in the Handover Required message are determined and registered in the bearer user identification table 321A of the source oGW (#1) 124.

[Operation 2-3]

The source MME (#1) 121 sends a Forward Relocation Request message to the handover-destination MME (target MME (#2)) 121 (FIG. 7A, <3>). The target MME (#2) transmits the Handover Request message (FIG. 17) to the target eNB (#2) 111 (FIG. 7A, <4>). The handover-destination off-load GW (target oGW (#2)) 124 intercepts the Handover Request message (FIG. 7A, <5>) and executes the process depicted in FIG. 31.

[Operation 2-4]

As a result of the interception of the Handover Request message, as depicted in FIG. 43, the target oGW (#2) 124 stores and determines the oGW UE identifier, the MME UE identifier, the MME apparatus identifier, the eNB apparatus identifier, the user line identifier, the uplink line allocation information, and the t-target cell identification information in the bearer user identification table 321A and the bearer table 321B.

[Operation 2-5]

The target eNB (eNB#2) 111 sends the Handover Request Ack. message (FIG. 18) to the target MME (#2) 121 (FIG. 7A, <6>). The target oGW (#2) 124 intercepts the Handover Request Ack. message and executes the process of FIG. 32 (FIG. 7A, <7>).

[Operation 2-6]

As a result of the process of FIG. 32, as depicted in FIG. 43, the target oGW (#2) 124 stores and determines the downlink line allocation information in the bearer table 231B. The target oGW (#2) 124 stores and determines the t-Target cell UE identification information acquired from the Handover Request Ack. message in the bearer user identification table 321A.

[Operation 2-7]

The target MME (#2) 121 receiving the Handover Request Ack. message sends a Forward Relocation Response message to the source MME (MME#1) 121 (FIG. 7A, <8>). The source MME (MME#1) 121 then transmits the Handover Command message (FIG. 19) to the target eNB (eNB#1) (FIG. 7A, <9>). The source oGW (#1) 124 intercepts the Handover Command message (FIG. 7A, <10>) and executes the process of FIG. 33.

[Operation 2-8]

As a result of the process of FIG. 35, the source oGW (#1) 124 registers and determines the s-Target cell UE identification information in the bearer user identification table 321A (see FIG. 43). As a result, the Target ID, the s-Target cell identification information, and the s-Target cell UE identification information of the bearer user identification table 321A of the source oGW (#1) 124 match the eNB apparatus identifier, the t-Target cell identification information, and the t-Target cell UE identification information of the bearer user identification table 321A of the target oGW (oGW#2) 124. Therefore, the oGW UE identifier (8000) of the source oGW (#1) 124 for the mobile terminal (mobile terminal (UE#x) 105) 105 can be correlated with the oGW UE identifier (8102) of the target oGW (#2) 124.

[Operation 2-9]

FIG. 44 is a chart of an example of takeover of the off-load condition application state in the S1-based handover between off-load GWs. As a result of the process of FIG. 35, as depicted in FIG. 44, the source oGW (#1) 124 cooperates with the target oGW (#2) 124 to register copies of the user line identifier and the multicast viewing information corresponding to the oGW UE identifier (8000) of the off-load condition application state management table 322 of the oGW (#1) 124 into the off-load condition application state management table 322 of the oGW (#2) 124 in correlation with the oGW UE identifier (8102) of the mobile terminal (UE#x) 105 in the oGW (#2) 124.

As a result, the target oGW (#2) 124 can know the multicast viewing information for each off-load object traffic (FIG. 7A, <11>) and transmits the packet (IGMP-join) depicted in FIG. 11 to the multicast network (FIG. 7A, <12>).

FIG. 45 is a chart of a flow of traffic at the time of takeover of the off-load condition application state in the S1-based handover between off-load GW apparatuses. The multicast delivery of IPTV broadcasting can be maintained in the S1-based handover associated with movement of the mobile terminal (mobile terminal (UE#x) 105) 105. In particular, the shift is made to the path of the mobile terminal (mobile terminal (UE#x) 105) 105—the base station (eNB#2) 111—the distribution point (oGW#2) 124—the IPTV broadcast station 141.

[Operation 2-10]

The data from the mobile terminal (UE#x) 105 received by the eNB (#2) 111 (FIG. 7A, <13>) is transmitted to the IPTV broadcast station 141 as follows. The GTP-u packet (IGMP-join, see FIG. 9) is transmitted from the eNB (#2) 111 to the S-GW (#2) 122 (FIG. 7A, <14>). The oGW (#2) 124 of the distribution point receives the packet and executes the process of FIG. 26 to transmit the packet (IGMP-join) depicted in FIG. 11 via the multicast network to the IPTV broadcast station 141 (FIG. 7A, <15>).

[Operation 2-11]

On the other hand, the data from the IPTV broadcast station 141 to the mobile terminal (UE#x) 105 is transmitted as follows. The downlink data from the IPTV broadcast station 141 is transmitted via the multicast network to the oGW (#2) 124 through the packet depicted in FIG. 12 (FIG. 7A, <16>). The oGW (#1) 124 receives the packet depicted in FIG. 12 and executes the process of FIG. 27 to transmit the packet (IPTV broadcast delivery) of FIG. 10 to the eNB (#2) 111 (FIG. 7A, <17>). The eNB (#2) 111 sends downlink data to the mobile terminal (UE#x) 105 (FIG. 7A, <18>).

[Operation 2-12]

The source MME (MME#1) 121 transmits the UE Context Release Command message (FIG. 20) to the source eNB (#1) 111 so as to release the resource ensured for the mobile terminal (UE#x) 105 (FIG. 7A, <19>). The source oGW (#1) 124 then intercepts the UE Context Release Command message (FIG. 7A, <20>) and executes the process depicted in FIG. 34.

[Operation 2-13]

FIG. 46 is a chart of the bearer state management table in the off-load condition application state while IPTV broadcast viewing is maintained after completion of the S1-based handover and FIG. 47 is a chart of the off-load condition application state management table in the off-load condition application state while IPTV broadcast viewing is maintained after completion of the S1-based handover.

As a result of the process depicted in FIG. 34, a record corresponding to the oGW UE identifier (8000) in the source oGW (#1) is deleted. Therefore, the corresponding records are deleted in the bearer user identification table 321A, the bearer table 321B, and the off-load condition application state management table 322 (see FIGS. 46 and 47). The resource of the distribution point of the source oGW (#1) 124 is released.

FIG. 48 is a chart of a flow of traffic in the off-load condition application state during IPTV broadcast viewing after completion of the S1-based handover. As a result of the processes described above, as depicted in FIG. 48, the resource of the source oGW (#1) 124 is released in terms of viewing of the IPTV broadcasting, and the relay of the IPTV broadcasting from the source oGW (#1) 124 to the mobile terminal (UE#x) 105 is terminated. The IPTV broadcasting is maintained via the target oGW (oGW#2) 124 to the mobile terminal (UE#x) 105.

Operation Example 3

Maintenance of IPTV Broadcast Viewing in X2-Based Handover

Description will be made of the operation when the handover is achieved from the source eNB (#1) 111 to the target eNB (#2) 111 due to movement of the mobile terminal (UE#x) 105 while maintaining the IPTV broadcasting on the mobile terminal (UE#x) 105 with reference to the sequence depicted in FIG. 7B.

[Operation 3-1]

When the source eNB (#1) 111 starts the X2-based handover due to movement of the mobile terminal (UE#x) 105, the X2AP: Handover request message (FIG. 21) is transmitted from the source eNB (#1) 111 to the target eNB (#2) 111 (FIG. 7B, <1>). The source oGW (#1) 124 intercepts the X2AP: Handover request message (FIG. 7B, <2>) and executes the process depicted in FIG. 35.

[Operation 3-2]

FIG. 49 is a chart of an example of takeover of the off-load condition application state in the X2-based handover between off-load GWs. As a result of the process depicted in FIG. 35, the source oGW (#1) 124 determines the eNB UE identifier (X2AP) of the bearer user identification table 321A (see FIG. 49).

[Operation 3-3]

The target oGW (#2) 124 intercepts the X2AP: Handover request message (FIG. 7B, <3>) and executes the process depicted in FIG. 35.

[Operation 3-4]

In the target oGW (#2) 124, as depicted in FIG. 49, the oGW UE identifier, the MME UE identifier, the MME apparatus identifier, the eNB apparatus identifier, the user line identifier, and the uplink line allocation information are determined and stored in the bearer user identification table 321A and the bearer table 321B.

[Operation 3-5]

At this point, as depicted in FIG. 49, the MME UE identifier of the bearer user identification table 321A of the oGW (#1) 124 is identical to the MME UE identifier of the bearer user identification table 321A of the oGW (#2) 124. Therefore, the GW UE identifier (8000) of the oGW#1 and the GW UE identifier (8102) of the oGW#2 can be correlated with the mobile terminal (UE#x) 105.

[Operation 3-6]

FIG. 50 is a chart of an example of takeover of the off-load condition application state in the X2-based handover between off-load GWs. The copies of the user line identifier and the multicast viewing information of the off-load condition application state management table 322 corresponding to the oGW UE identifier of the oGW (#1) 124 are delivered from the oGW (#1) 124 to the oGW (#2) 124. The oGW (#2) 124 stores the copies into the off-load condition application state management table 322 of the oGW (#2) 124. As a result, the oGW (#2) 124 can know the multicast viewing information for each off-load object traffic (FIG. 7B, <4>) and transmits the multicast packet (IGMP-join) depicted in FIG. 11 to the multicast network (FIG. 7B, <5>).

[Operation 3-7]

The X2AP: Handover Request Ack. message is then transmitted from the target eNB (eNB#2) and arrives via the oGW (#2) and the oGW (#1) at the source eNB (#1) (FIG. 7B, <6>). Subsequently, the downlink data from the multicast network and the P-GW (PGW) 123 arrives at the mobile terminal (UE#x) 105 via the source eNB (#1) 111, the oGW (#1) 124, the oGW (#2) 124, and the target eNB (#2) 111 (FIG. 7B, <7>). The uplink data from the mobile terminal (UE#x) 105 is transmitted via the target eNB (#2) 111 and the oGW (#2) 124 to the multicast network (P-GW 123) (FIG. 7B, <8>).

[Operation 3-8]

The target eNB (#2) 111 then transmits the Path Switch Request message (FIG. 24) to the MME (MME#1) (FIG. 7B, <9>). The target oGW (#2) 124 intercepts the Path Switch Request message (FIG. 7B, <10>) and executes the process of FIG. 37.

[Operation 3-9]

As a result of the process of FIG. 37, the oGW UE identifier, the MME UE identifier, the MME apparatus identifier, the eNB apparatus identifier, the user line identifier, and the downlink line allocation information are determined in the bearer state management table 321 (FIG. 49) of the oGW (#2) 124.

[Operation 3-10]

The MME (MME#1) 121 then transmits the Path Switch Request Ack. message (FIG. 25) to the target eNB (eNB#2) 111 (FIG. 7B, <11>). The target oGW (oGW#2) 124 intercepts the Path Switch Request Ack. message and executes the process depicted in FIG. 38 (FIG. 7B, <12>).

[Operation 3-11]

As a result of the process depicted in FIG. 38, the uplink line allocation information corresponding to the oGW UE identifier (8102) is switched from the S-GW (#1) 122 to the S-GW (#2) 122 in the bearer table 321B of the target oGW (#2) 124 (see FIG. 49).

Figure 51:
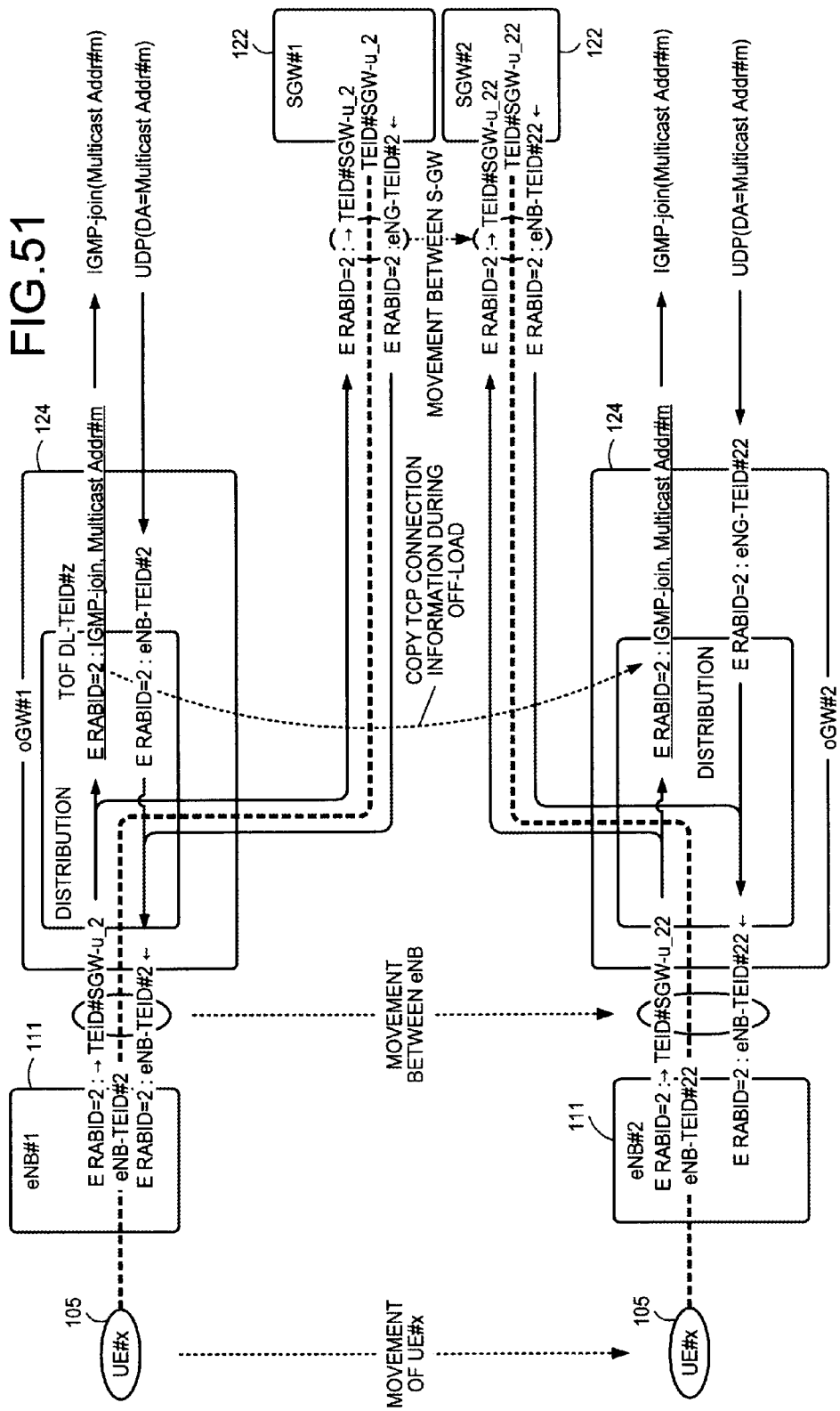
FIG. 51 is a diagram of a flow of traffic at the time of takeover of the off-load condition application state in the X2-based handover between off-load GW apparatuses.

FIG. 51 is a diagram of a flow of traffic at the time of takeover of the off-load condition application state in the X2-based handover between off-load GW apparatuses. In the X2-based handover associated with movement of the mobile terminal (UE#x) 105, the shift is made to the path of the mobile terminal (UE#x) 105→the eNB (#2) 111→the oGW (#2) 124→the IPTV broadcast station 141 while the viewing of the IPTV broadcasting is maintained.

[Operation 3-12]

The uplink data from the mobile terminal (UE#x) 105 to the IPTV broadcast station 141 is transmitted as follows. The uplink data from the mobile terminal (UE#x) 105 received by the eNB (#2) 111 (FIG. 7B, <13>) is transmitted through the GTP-u packet (FIG. 9) addressed to the S-GW (#1) 122 (FIG. 7B, <14>). When receiving the packet of FIG. 9, the oGW (#2) 124 executes the process of FIG. 26 and sends the packet depicted in FIG. 11 to the multicast network for transmission to the IPTV broadcast station 141 (FIG. 7B, <15>).

[Operation 3-13]

On the other hand, the downlink data from the IPTV broadcast station 141 to UE is transmitted as follows. The IPTV broadcast station 141 transmits the multicast packet (IPTV broadcast delivery) depicted in FIG. 12 (FIG. 7B, <16>). When receiving the multicast packet, the oGW (#2) 124 executes the process of FIG. 27 and sends the packet of FIG. 10 to the eNB (#2) 111 (FIG. 7B, <17>). The eNB (#2) 111 sends the downlink data to the mobile terminal (UE#x) 105 (FIG. 7B, <18>).

[Operation 3-14]

Although not depicted in FIG. 7B, the target eNB (#2) 111 then transmits the X2AP: UE Context Release message to the source eNB (#1) 111 (FIG. 23). The source oGW (#1) 124 intercepts the X2AP: UE Context Release message and executes the process depicted in FIG. 36.

As a result of the process of FIG. 36, a record corresponding to the oGW UE identifier (8000) in the source oGW (#1) 124 is deleted from the bearer user identification table 321A and the bearer table 321B (as is the case with FIG. 46) and is deleted from the off-load condition application state management table 322 (as is the case with FIG. 47). The resource of the source oGW (#1) 124 is released.

Figure 52:
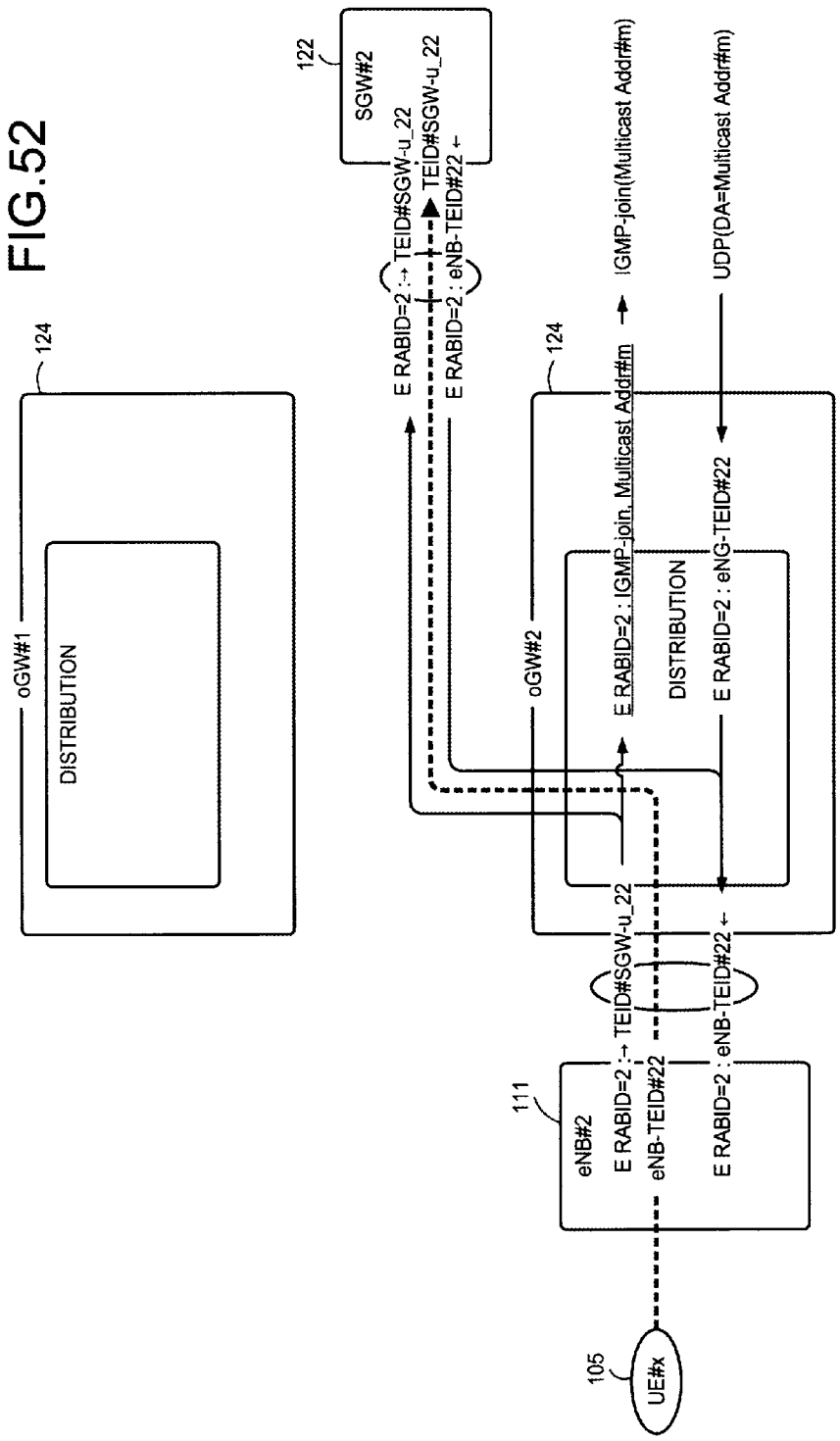
FIG. 52 is a diagram of a flow of traffic in the off-load condition application state during IPTV broadcast viewing after completion of the X2-based handover.

FIG. 52 is a diagram of a flow of traffic in the off-load condition application state during IPTV broadcast viewing after completion of the X2-based handover. As a result of the processes described above, as depicted in FIG. 52, the resource of the source oGW (#1) 124 is released in terms of viewing of the IPTV broadcasting, and the relay of the IPTV broadcasting from the source oGW (#1) 124 to the mobile terminal (UE#x) 105 is terminated. The IPTV broadcasting is maintained via the oGW (oGW#2) 124 to the mobile terminal (UE#x) 105.

Operation Example 4

Start of New IPTV Broadcast Viewing after Handover

Description will be made of the case that the mobile terminal (UE#x) 105 starts new IPTV broadcast viewing after handover while maintaining IPTV broadcast viewing.

[Operation 4-1]

When the mobile terminal (UE#x) 105 starts new connection with the IPTV broadcast station 141, the GTP-u packet (IGMP-join, FIG. 9) for a viewing request is transmitted from the target eNB (#2) 111 to the target S-GW (#2) 122. The target oGW (#2) 124 receives the GTP-u packet and executes the process depicted in FIG. 26 to transmit the packet depicted in FIG. 11 to the multicast network.

[Operation 4-2]

FIG. 53 is a chart of a change in the off-load condition application state at the start of new IPTV broadcast viewing after handover. As depicted in FIG. 53, new multicast viewing information corresponding to the oGW UE identifier and the user line identifier is stored in the off-load condition application state management table 322 of the target oGW (#2) 124.

[Operation 4-3]

When the packet (IGMP-join) depicted in FIG. 11 arrives via the multicast network at the IPTV broadcast station 141, the multicast packet (IPTV broadcast delivery) depicted in FIG. 12 is transmitted by the IPTV broadcast station 141 via the multicast network and arrives at the oGW (#2) 124. The oGW (#2) receives the multicast packet and executes the process depicted in FIG. 27.

[Operation 4-4]

The oGW (#2) 124 transmits the packet (IPTV broadcast delivery) of FIG. 10 to the target eNB (#2) 111.

Figure 54:
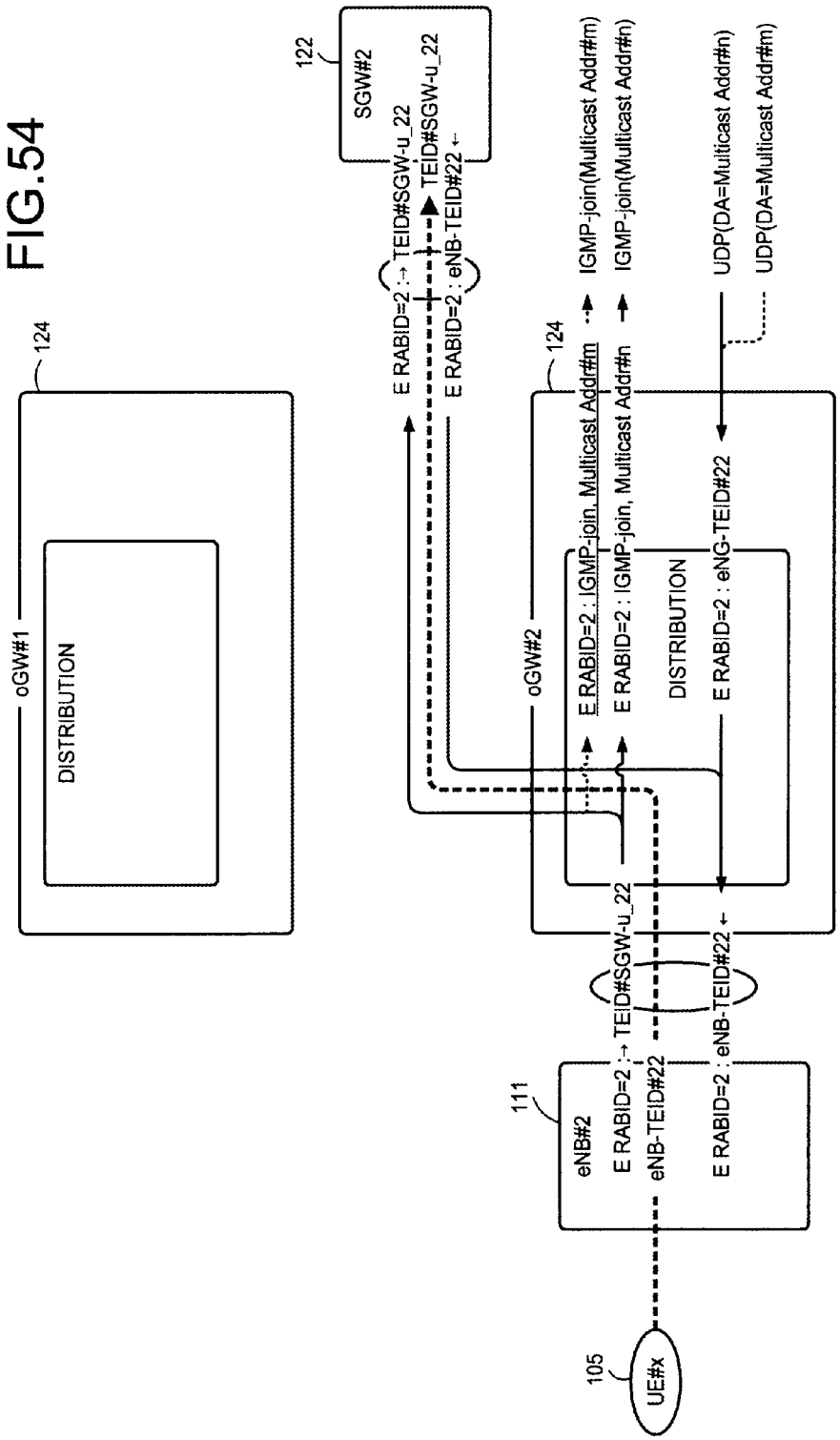
FIG. 54 is a diagram of a flow of traffic in the off-load condition application state at the start of new IPTV broadcast viewing after handover.

FIG. 54 is a diagram of a flow of traffic in the off-load condition application state at the start of new IPTV broadcast viewing after handover. A multicast address corresponding to the new IPTV broadcast is added and the mobile terminal (UE#x) 105 makes a new multicast viewing request and the viewing of the multicast packet (IPTV broadcast delivery) is enabled.

[Operation 4-5]

The transmission paths of uplink data and downlink data between the mobile terminal (UE#x) 105 and the IPTV broadcast station 141 and the processes of the oGW (#1) and the oGW (#2) related to the maintained IPTV broadcasting are the same as Operation Examples 2 and 3 and will not be described.

The uplink data from the mobile terminal (UE#x) 105 of the new IPTV broadcast viewing to the IPTV broadcast station 141 is transmitted as follows. The uplink data is transmitted from the eNB (#2) 111 to the S-GW (#2) 122 through the GTP-u packet (IGMP-join, FIG. 9). When receiving the packet, the oGW (#2) 124 executes the process depicted in FIG. 26 and sends the packet depicted in FIG. 11 via the multicast network to the IPTV broadcast station 141.

On the other hand, the downlink data from the IPTV broadcast station 141 to the mobile terminal (UE#x) 105 for the new IPTV broadcast viewing is transmitted as follows. For the downlink data, the multicast packet (IPTV broadcast delivery) depicted in FIG. 12 is transmitted from the IPTV broadcast station 141. When receiving the packet, the oGW (#2) 124 executes the process of FIG. 27 and sends the packet depicted in FIG. 10 to the eNB (#2) 111 for transmission to the mobile terminal (UE#x) 105.

Operation Example 5

Exit from IPTV Broadcast Viewing after Handover

Description will be made of the case that the mobile terminal (UE#x) 105 disconnects the IPTV broadcast viewing after handover while maintaining IPTV broadcast viewing.

[Operation 5-1]

When the mobile terminal (UE#x) 105 stops viewing of the IPTV broadcast station 141, the GTP-u packet (IGMP-leave, FIG. 9) is transmitted from the target eNB (#2) 111 to the target S-GW (#2) 122. The target oGW (#2) 124 receives the GTP-u packet and executes the process depicted in FIG. 26 to transmit the packet (IGMP-leave) depicted in FIG. 11 to the multicast network.

[Operation 5-2]

FIG. 55 is a chart of a change in the off-load condition application state at the time of exit from IPTV broadcast viewing after handover. As a result of the process depicted in FIG. 26, as depicted in FIG. 55, a record (the oGW UE identifier, the user line identifier, and the multicast viewing information) corresponding to the IPTV broadcast viewing is deleted from the off-load condition application state management table 322 of the target oGW (#2) 124.

[Operation 5-3]

The multicast packet (IPTV broadcast delivery) depicted in FIG. 12 arrives from the IPTV broadcast station 141 via the multicast network at the target oGW (#2) 124. When receiving the packet, the target oGW (#2) 124 executes the process depicted in FIG. 27 and does not relay the multicast packet (IPTV broadcast delivery) to the mobile terminal (UE#x) 105 stopping the viewing of the IPTV broadcasting.

Figure 56:
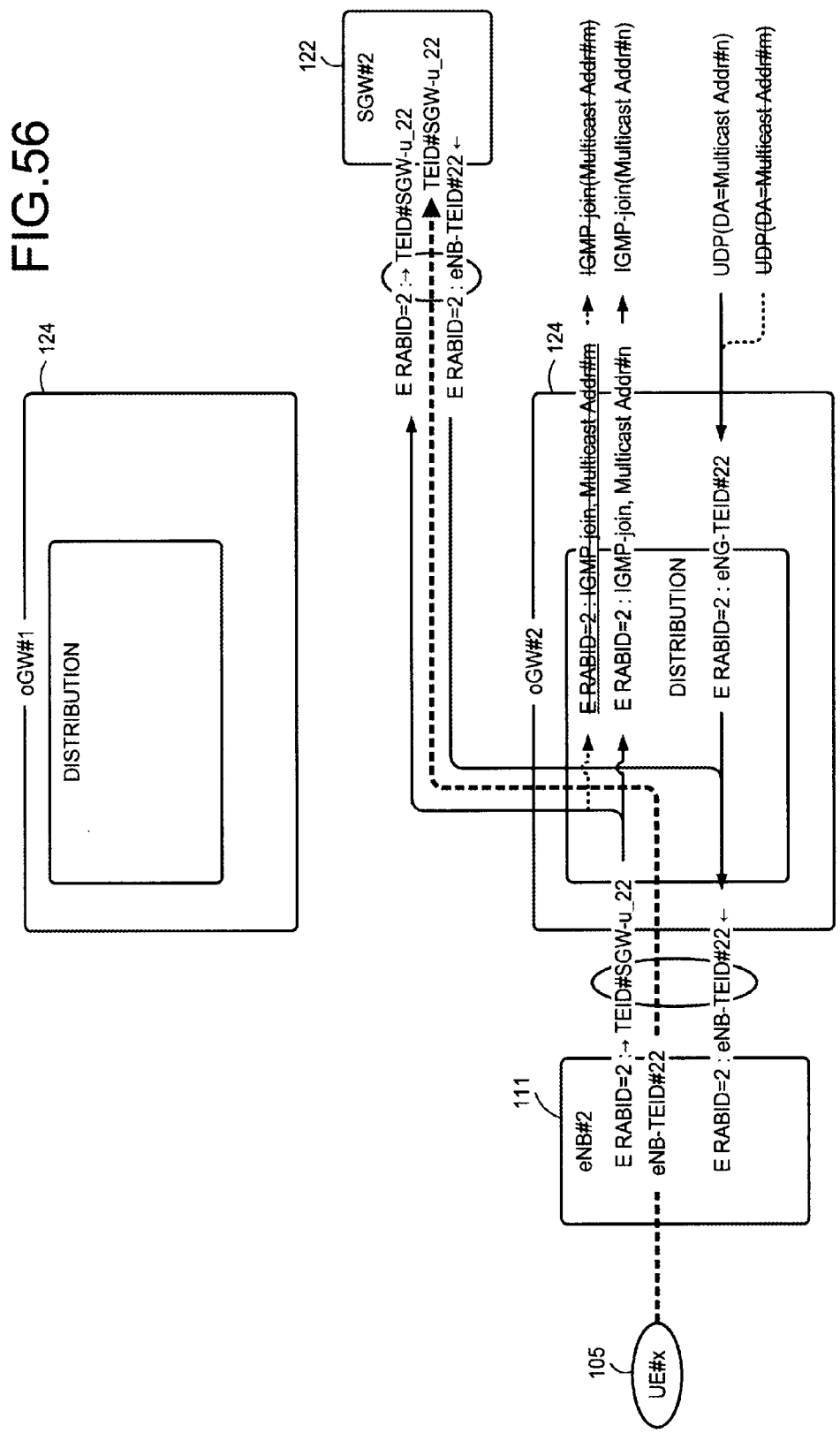
FIG. 56 is a diagram of a flow of traffic in the off-load condition application state at the time of exit from IPTV broadcast viewing after handover.

FIG. 56 is a diagram of a flow of traffic in the off-load condition application state at the time of exit from IPTV broadcast viewing after handover. As depicted in FIG. 56, the path for the IPTV broadcast viewing is deleted. The path for the new IPTV broadcast viewing is maintained.

[Operation 5-4]

The uplink and downlink paths related to the new IPTV broadcast viewing are not changed from the time of participation in the new IPTV broadcast viewing and will not be described. The path of the IPTV broadcast viewing disappears due to exit from the viewing. FIG. 57 is a chart of a change in the off-load condition application state at the time of exit from IPTV broadcast viewing after handover. The bearer state management table 321 after exit from the IPTV broadcast viewing is depicted.

According to the embodiments described above, the handover-source off-load GW manages the multicast viewing information of the IPTV broadcasting during off-load viewing as an off-load condition application state for each user line. When a mobile terminal moves, the multicast viewing information is transferred (copied) from the handover-source off-load GW to the handover-destination off-load GW. The handover-destination off-load GW participates in multicast viewing on behalf of the mobile terminal. The handover-source off-load GW exits from multicast viewing on behalf of the mobile terminal. As a result, sequences of communication can be reduced between the off-load GWs and the mobile terminal. The IPTV broadcasting can continuously be viewed on the mobile terminal without interruption at the time of handover.

No wireless band is wasted at the time of handover. Particularly, when a first off-load GW accommodates a mobile terminal used for viewing an IPTV broadcast program and the mobile terminal moves to a second off-load GW, traffic can be reduced that is used for the connection of a new communication line for IPTV viewing and the an IPTV viewing participation request at a new location between the mobile terminal and the second off-load GW, and the disconnection of an old communication line for IPTV viewing at an old position between the mobile terminal and the first off-load GW.

When the off-load GW accommodates multiple mobile terminals used for viewing an IPTV broadcast program, multicast transmission can be performed by utilizing one communication line from an IPTV broadcast station via a P-GW and an S-GW to the off-load GW and it is not necessary to ensure a communication path to the P-GW for each of the mobile terminals and therefore, traffic can be reduce in a core network (EPC network) etc.

The handover method of multicast traffic described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

According to one embodiment, even during movement of a mobile terminal, increases in traffic on a network can be suppressed and multicast delivered contents can be viewed continuously.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An off-load apparatus disposed between a core network accommodating a plurality of base stations and the base stations capable of connection with a mobile station, the off-load apparatus comprising:
    a storage unit that stores line information and multicast viewing information of the mobile station when the mobile station performs multicast communication of an off-load object via the off-load apparatus;
    a transferring unit that transfers the line information and the multicast viewing information of the mobile station to another off-load apparatus that is an handover destination when the mobile station moves during the multicast communication; and
    a control unit that edits and transmits to an IPTV broadcast station, participation in multicast viewing when the off-load apparatus acts as a handover-destination apparatus, based on the multicast viewing information transferred from a handover-source off-load apparatus.

2. The off-load apparatus according to claim 1, wherein the control unit additionally requests participation in multicast viewing based on the multicast viewing information transferred from a handover-source off-load apparatus, when the off-load apparatus acts as a handover-destination apparatus and already performs multicast communication of an off-load object of another mobile station.

3. The off-load apparatus according to claim 1, wherein the control unit executes a process of exiting from multicast viewing, when the off-load apparatus acts as a handover-source apparatus.

4. The off-load apparatus according to claim 1, wherein the control unit handles handover performed within a management range of a single mobility management entity and executes a process in response to a handover request from a mobile terminal.

5. The off-load apparatus according to claim 1, wherein the control unit handles handover performed over different mobility management entities and executes a process in response to a handover request from a mobile terminal.

6. A network system comprising:
    a plurality of base stations capable of connection with a mobile station;
    a core network accommodating the base stations; and
    an off-load apparatus disposed between the core network and the base stations, wherein
    the off-load apparatus includes:
        a storage unit that stores line information and multicast viewing information of the mobile station when the mobile station performs multicast communication of an off-load object via the off-load apparatus,
        a transferring unit that transfers the line information and the multicast viewing information of the mobile station to another off-load apparatus that is an handover destination when the mobile station moves during the multicast communication, and
        a control unit that edits and transmits to an IPTV broadcast station, participation in multicast viewing when the off-load apparatus acts as a handover-destination apparatus, based on the multicast viewing information transferred from a handover-source off-load apparatus.

7. A handover method of multicast traffic in a network system that includes a plurality of base stations capable of connection with a mobile station, a core network accommodating the base stations, and an off-load apparatus disposed between the core network accommodating and the base stations, the handover method comprising:
    transferring based on line information and multicast viewing information of the mobile station when the mobile station performs multicast communication of an off-load object via the off-load apparatus, the line information and the multicast viewing information of the mobile station to another off-load apparatus that is an handover destination when the mobile station moves during the multicast communication; and
    editing and transmitting to an IPTV broadcast station, participation in multicast viewing when the off-load apparatus acts as a handover-destination apparatus, based on the multicast viewing information transferred from a handover-source off-load apparatus.

* * * * *